United States Patent
Si et al.

(10) Patent No.: US 10,334,574 B2
(45) Date of Patent: Jun. 25, 2019

(54) UPLINK DATA TRANSMISSION METHOD AND DEVICE

(71) Applicant: CHINA ACADEMY OF TELECOMMUNICATIONS TECHNOLOGY, Beijing (CN)

(72) Inventors: Qianqian Si, Beijing (CN); Yanan Lin, Beijing (CN); Xueming Pan, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 15/747,750

(22) PCT Filed: Jun. 23, 2016

(86) PCT No.: PCT/CN2016/086896
§ 371 (c)(1),
(2) Date: Jan. 25, 2018

(87) PCT Pub. No.: WO2017/016351
PCT Pub. Date: Feb. 2, 2017

(65) Prior Publication Data
US 2018/0220411 A1    Aug. 2, 2018

(30) Foreign Application Priority Data
Jul. 28, 2015   (CN) .......................... 2015 1 0451485

(51) Int. Cl.
*H04J 4/00*         (2006.01)
*H04W 72/04*     (2009.01)
(Continued)

(52) U.S. Cl.
CPC ....... *H04W 72/0413* (2013.01); *H04L 1/1812* (2013.01); *H04W 72/1268* (2013.01);
(Continued)

(58) Field of Classification Search
None
See application file for complete search history.

(56) References Cited

U.S. PATENT DOCUMENTS 9,419,750 B2 *   8/2016   Roh .................. H03M 13/2966
9,877,321 B2 *   1/2018   Visotsky ........... H04W 72/0446
(Continued)

FOREIGN PATENT DOCUMENTS

CN    101400140 A    4/2009
CN    101409582 A    4/2009
(Continued)

OTHER PUBLICATIONS

Nsn et al: "On HARQ timing for TDD eIMTA", 3GPP Draft; R1-133477, 3rd Generation Partnership Project (3GPP), Mobile Competence Centre ; 650, Route Des Lucioles ; F-06921 Sophia Antipolis Cedex; France, Aug. 10, 2013; 4 pages.
(Continued)

*Primary Examiner* — Kwang B Yao
*Assistant Examiner* — Juvena W Loo
(74) *Attorney, Agent, or Firm* — Kilpatrick Townsend & Stockton LLP

(57) ABSTRACT

The present invention discloses an uplink data transmission method and device configured to shorten RTT in a transmission condition having a short time slot, thus reducing a user-plane latency and improving the system performance. An embodiment of the present invention provides an uplink data transmission method. The method comprises: determining, by the network side, a time slot size for data transmission, and sending, according to the time slot size, uplink scheduling signaling to a user equipment (UE); and receiving, by the network side and according to a predetermined scheduled timing, uplink data sent by the UE, wherein the time slot is a time unit having a duration smaller than 1 ms,
(Continued)

and the predetermined scheduled timing is that when the network side employs a time slot n to send the uplink scheduling signaling, the network side receives the uplink data sent by the UE in a time slot (n+1), with l∈L, n and l both being integers greater than or equal to zero, and L denoting the set of selectable values of l.

12 Claims, 6 Drawing Sheets

(51) Int. Cl.
*H04L 1/18* (2006.01)
*H04W 72/12* (2009.01)
*H04L 5/14* (2006.01)

(52) U.S. Cl.
CPC ........... *H04W 72/1289* (2013.01); *H04L 5/14* (2013.01); *H04W 72/0446* (2013.01)

(56) References Cited

U.S. PATENT DOCUMENTS

| 10,117,188 | B2* | 10/2018 | Nory .................... H04L 1/1854 |
| 2014/0321338 | A1 | 10/2014 | Park et al. |
| 2015/0043488 | A1 | 2/2015 | Hakola et al. |
| 2015/0078222 | A1 | 3/2015 | Yang et al. |
| 2015/0092637 | A1 | 4/2015 | Yang et al. |
| 2015/0173048 | A1 | 6/2015 | Seo et al. |
| 2017/0063516 | A1* | 3/2017 | Miao ......................... H04L 5/14 |
| 2017/0318564 | A1* | 11/2017 | Lee ........................... H04L 1/00 |
| 2018/0035430 | A1* | 2/2018 | Futaki .................. H04W 72/04 |

FOREIGN PATENT DOCUMENTS

| CN | 102638333 A | 8/2012 |
| CN | 103378961 A | 10/2013 |
| CN | 104396173 A | 3/2015 |
| CN | 102752862 A | 9/2015 |
| JP | 2017523628 A | 8/2017 |
| WO | 2015172363 A1 | 11/2015 |

OTHER PUBLICATIONS

Catt et al: "Initial analysis on latency reduction", 3GPP Draft; R2-152274 Initial Analysis on Latency Reduction, 3rd Generation Partnership Project (3GPP), Mobile Competence Centre ; 650, Route Des Lucioles ; F-06921 Sophia-Antipolis Cedex; France, May 24, 2015; 6 pages.

3GPP TS 36.213, V12.6.0(Jun. 2015), 3rd Generation Partnership Project, Technical Specification Group Radio Access Network, Evolved Universal Terrestrial Radio Access (E-UTRA), Physical layer procedures (Release 12), Jan. 11, 2019, 10 pages.

3GPP TSG-RAN WG2 #90, Tdoc R2-152415, "Areas for reducing latency", Fukuoka, Japan, May 25-29, 2015, 4 pages.

* cited by examiner

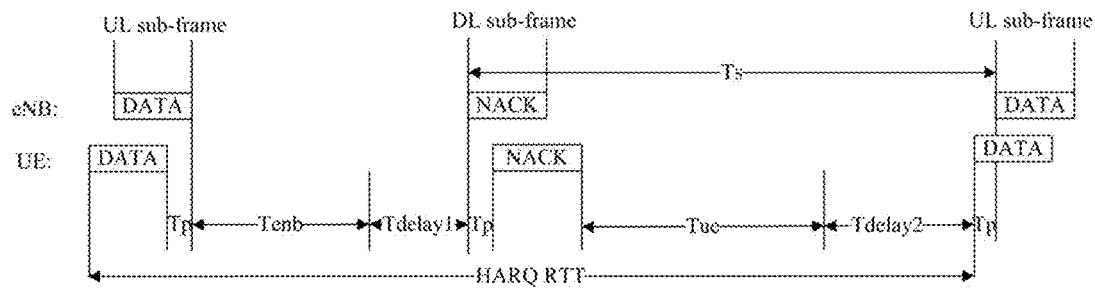

Fig.1

The network side determines a size of a slot for transmitting data, and transmits uplink scheduling signaling to a UE according to the size of the slot — S101

The network side receives uplink data transmitted by the UE according to predefined scheduling timing; where the slot is a temporal unit with a length shorter than 1 millisecond, and the predefined scheduling timing is: when the network side transmits the uplink scheduling signaling in a slot n, the network side receives the uplink data transmitted by the UE in a slot n+$l$, where $l \in L$, both n and $l$ are integers more than or equal to zero, and L represents a set of values — S102

Fig.2

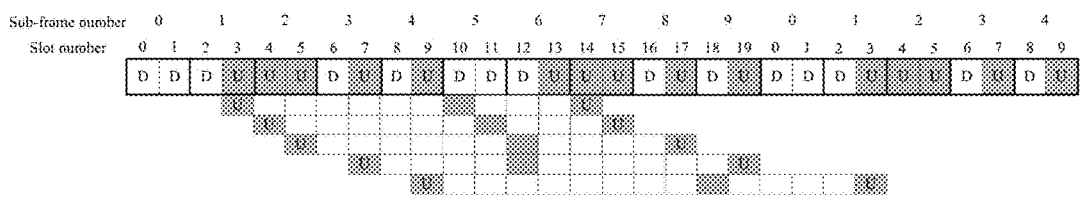

UPLINK DATA TRANSMISSION METHOD AND DEVICE

This application is a US National Stage of International Application No. PCT/CN2016/086896, filed on Jun. 23, 2016, designating the United States and claiming priority to Chinese Patent Application No. CN201510451485.0, filed with the Chinese Patent Office on Jul. 28, 2015 and entitled "A method and apparatus for transmitting uplink data", the content of which is hereby incorporated by reference in its entirety.

FIELD

The present disclosure relates to the field of communications, and particularly to a method and apparatus for transmitting uplink data.

BACKGROUND

With a varying demand for mobile communication traffic, higher user-plane delay performance required for future mobile communication systems has been defined by several organizations such as the International Telecommunication Union (ITU). In order to shorten a user-plane delay, data can be transmitted in a shorter slot (less than 1 ms) to shorten a period of time for processing by a base station and a user equipment (UE) and a period of time for transmission in the slot. If existing uplink scheduling and feedback tuning is still applied, it is likely that the UE is unable to make a timely response to uplink scheduling signaling, and that the base station is also unable to make feedback for or schedule re-transmission of uplink data in time.

A frame structure in a Long Term Evolution (LTE) system is as follows.

In the LTE system, a 10 ms radio frame and a 1 ms sub-frame are defined in both the Frequency Division Duplex (FDD) mode and the Time Division Duplex (TDD) mode. Seven TDD uplink-downlink configurations are defined for the radio frame in the TDD mode as depicted in Table 1 below, where D represents a downlink (DL) sub-frame, U represents an uplink (UL) sub-frame, and S represents a special sub-frame in the TDD system. Downlink data in a sub-frame are transmitted in a slot of 1 ms.

TABLE 1

TDD uplink-downlink configurations

| Uplink-downlink configuration | Sub-frame No. | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

Scheduling timing of a Physical Uplink Shared Channel (PUSCH) in the LTE is as follows.

In the LTE TDD system, for the TDD uplink-downlink configurations 1 to 6 and conventional Hybrid Automatic Repeat Request (HARQ) operations, the UE adjusts corresponding PUSCH transmission in a sub-frame n+k (k is given in Table 2) according to indications of Physical Downlink Control Channel (PDCCH) transmission and Physical HARQ Indicator Channel (PHICH) transmission having the Downlink Control Information (DCI) format 0 or 4, detected in the sub-frame n.

For the TDD uplink-downlink configuration 0 and the conventional HARQ operations, if the Most Significant Bit (MSB) of an uplink index in the DCI format 0 is set to 1, or a PHICH is received over a corresponding resource $I_{PHICH}0$ in the sub-frame n=0 or 5, then corresponding PUSCH transmission in the sub-frame n+k (the value of k is given in Table 2) is adjusted. For the TDD uplink-downlink configuration 0, and the conventional HARQ operations, if the Least Significant Bit (LSB) of the uplink index in the DCI format 0 in the sub-frame n is set to 1, or a PHICH is received over a corresponding resource $I_{PHICH}=0$ in the sub-frame n=0 or 5, or a PHICH is received in the sub-frame n=1 or 6, then the UE adjusts corresponding PUSCH transmission in the sub-frame n+7. For the TDD uplink-downlink configuration 0, if both the MSB and the LSB of the uplink index in the DCI format 0 in the sub-frame n are set to 1, then the UE adjusts corresponding PUSCH transmission in the sub-frame n+k (the value of k is given in Table 2) and the sub-frame n+7.

TABLE 2

Values of k in TDD uplink scheduling

| Uplink-downlink configuration | Sub-frame No. | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

In the LTE system, a plurality of radio frames are arranged in a sequence, and Table 2 illustrates the values of k corresponding to each downlink sub-frame in one radio frames by way of an example, where if n+k>9, then n+k represents the (n+k−9)-th downlink sub-frame in a succeeding radio frame.

PUSCH HARQ feedback timing in LTE is as follows.

In an LTE FDD system, the UE detects PUSCH transmission in the uplink sub-frame n−4, and feeds back PHICH information over a corresponding PHICH resource in the downlink sub-frame n.

In the LTE TDD system, for the TDD uplink-downlink configurations 1 to 6, the UE detects PUSCH transmission in the uplink sub-frame n−k', and feeds back PHICH information over a corresponding PHICH resource in the downlink sub-frame n, where k' is as depicted in Table 3.

In the LTE TDD system, for the TDD uplink-downlink configuration 0, the UE detects PUSCH transmission in the uplink sub-frame n−k, and feeds back corresponding PHICH information over a PHICH resource corresponding to IPHICH=0 in the downlink sub-frame n, where k' is as depicted in Table 3; or the UE detects PUSCH transmission in the uplink sub-frame n−6, and feeds back corresponding PHICH information over a PHICH resource corresponding to IPHICH=1 in the downlink sub-frame n.

TABLE 3

Values of k' in TDD uplink feedback

| TDD uplink-downlink configuration | Sub-frame no. | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | 4 | | | | 6 |
| 2 | | | | 6 | | | | 6 | | |
| 3 | 6 | | | | | | | 6 | 6 | |
| 4 | | | | | | | | 6 | 6 | |
| 5 | | | | | | | 6 | | | |
| 6 | | 6 | 4 | | | 7 | 4 | | | 6 |

Round Trip Time (RTT) in the LTE system is described as follows.

The RTT is defined a period of time for a data packet to be transmitted at a time in an HARQ process and includes the following process: a transmitter starts to transmit a data packet, a receiver receives, processes the data packet and then feeds back an Acknowledgment (ACK) or a Non-Acknowledgement (NACK) signal according to a processing result, the transmitter demodulates the ACK or NACK signal and then decides to retransmit the data packet or to transmit a new data packet, in the next frame. As illustrated in FIG. 1, Tp represents a unidirectional propagation delay, Tue represents a processing delay after the UE receives feedback from an evolved Node B (eNB), and Tenb is a processing delay after the eNB receives uplink data. Tdelay1 represents a period of time for which the eNB must wait until the next downlink slot after it has processed an uplink transport block in the TDD frame structure. Tdelay2 represents a period of time for which the UE must wait until the next uplink slot after it has processed the feedback from the eNB in the TDD frame structure.

The FDD system has uniform RTT, and the RTT in the TDD system is dependent upon a particular uplink-downlink configuration.

A user-plane delay in the LTE system is introduced as follows.

As defined in Section B.2 of the appendix in 3GPP TR36.912, the user-plane delay in the LTE system includes a period of time for processing by the base station, a period of time for frame alignment, slot time, and a period of time for processing by the UE, where the period of time for frame alignment is a period of time for waiting between arrival of traffic and availability of an air-interface sub-frame for transmission of the traffic. If HARQ re-transmission in the system is taken into account, then the user-plane delay in the LTE system further includes a period of time for re-transmitting data.

In summary, when data is transmitted in a short slot in the LTE system, since a data packet transmitted at a time is small, the UE can prepare for uplink data transmission more quickly after reception of the scheduling signaling, and the base station can also demodulate the received data packet more quickly. If the existing uplink data scheduling and feedback timing is still applied, then the UE cannot make a timely response to the uplink scheduling signaling, and the period of time for feedback and re-transmission scheduling by the base station may be extended.

SUMMARY

Embodiments of the disclosure provide a method and apparatus for transmitting uplink data to shorten RTT during transmission in a short slot to shorten a user-plane delay and improve performance of a system.

An embodiment of the disclosure provides a method for transmitting uplink data. The method includes the following operations: determining, by a network side, a size of a slot for transmitting data and transmitting uplink scheduling signaling to a UE according to the size of the slot; and receiving, by the network side, uplink data transmitted by the UE according to predefined scheduling timing. The slot is a temporal unit whose length is shorter than 1 millisecond, and the predefined scheduling timing is: when the network side transmits the uplink scheduling signaling in a slot n, the network side receives the uplink data transmitted by the UE in a slot where n+l, where l∈L, n is an integer greater than or equal to 0, l is an integer greater than or equal to 1, and L represents a set of values of l.

With this method, the UE transmitting in a short slot can prepare the uplink data more quickly after reception of the uplink scheduling signaling transmitted by the network side, and the network side can also decode a received uplink data packet and make feedback or schedule re-transmission more quickly, thus shortening RTT during transmission in the short slot, shortening a user-plane delay, and improving the performance of the system.

Optionally the length of the slot is seven Orthogonal Frequency Division Multiplexing (OFDM) symbols. For the downlink slot n=0 or 1 or 10 or 11, L={4}; for the downlink slot n=2 or 12, L={5, 7}; and for the downlink slot n=8 or 18, L={5}. Or, for the downlink slot n=0 or 10, L={5}; for the downlink slot n=1 or 8 or 11 or 18, L={6}; and for the downlink slot n=2 or 6 or 12 or 16, L={7}. Or, for the downlink slot n=0 or 10, L={4}; for the downlink slot n=1 or 11, L={4, 6}; and for the downlink slot n=2 or 12, L={7, 11}. Or, for the downlink slot n=0 or 10, L={4, 5}; for the downlink slot n=1 or 11, L={5, 6}; and for the downlink slot n=2 or 12, L={6, 7}. Or, for the downlink slot n=0 or 10, L={4, 5, 6}; for the downlink slot n=1 or 11, L={6, 7, 8}; and for the downlink slot n=2 or 12, L={8, 9, 10, 11}.

Optionally the length of the slot is three OFDM symbols. For the downlink slot n=0 or 1 or 2 or 3 or 20 or 21 or 22 or 23, L={8}; for the downlink slot n=4 or 5 or 16 or 17 or 24 or 25 or 36 or 37, L={10}; and for the downlink slot n=12 or 13 or 32 or 33, L={6}. Or, for the downlink slot n=0 or 20, L={6, 7}; for the downlink slot n=1 or 21, L={7, 8}; for the downlink slot n=2 or 22, L={8, 9}; for the downlink slot n=3 or 23, L={11, 12}; and for the downlink slot n=4 or 24, L={14, 15}. Or, for the downlink slot n=0 or 20, L={8, 9}; for the downlink slot n=1 or 21, L={9, 10}; for the downlink slot n=2 or 22, L={10, 11}; for the downlink slot n=3 or 23. L={11, 12, 13}; and for the downlink slot n=4 or 24, L={13, 14, 15}. Or, for the downlink slot n=0 or 20, L={4, 5, 6, 7}; for the downlink slot n=1 or 21, L={7, 8, 9, 10}; for the downlink slot n=2 or 22, L={10, 11, 12, 13}; for the downlink slot n=3 or 23, L={13, 14, 15, 16}; and for the downlink slot n=4 or 24, L={16, 17, 18, 19}.

Optionally after the network side receives the uplink data transmitted by the UE according to the predefined scheduling timing, the method further includes transmitting, by the network side, feedback for the uplink data to the UE according to predefined uplink data feedback timing. The predefined feedback timing is that when the network side receives the uplink data transmitted by the UE in a slot m−k, the network side transmits feedback for the uplink data to the UE in a slot m, where k∈K, both m and k are integers more than or equal to zero, and K represents a set of values of k.

Optionally, the length of the slot is seven OFDM symbols. For the downlink slot m=0 or 1 or 10 or 11, K={7}; for the downlink slot m=2 or 12, K={5, 7}; and for the downlink slot m=8 or 18, K={9}. Or, for the downlink slot m=0 or 1 or 10 or 11, K={6}; for the downlink slot m=2 or 8 or 12 or 18, K={5}; and for the downlink slot m=6 or 16, K={7}. Or, for the downlink slot m=0 or 10, K={11}; for the downlink slot m=1 or 11, K={8, 7}; and for the downlink slot m=2 or 12, K={7, 5}. Or, for the downlink slot m=0 or 10, K={11, 6}; for the downlink slot m=1 or 11, K={6, 5}; and for the downlink slot m=2 or 12, K={5, 4}. Or, for the downlink slot m=0 or 10, K={11, 10, 9}; for the downlink slot m=1 or 11, K={9, 8, 7}; and for the downlink slot m=2 or 12, K={7, 6, 5, 4}.

Optionally the length of the slot is three OFDM symbols. For the downlink slot m=0 or 1 or 20 or 21, K={10}; for the downlink slot m=2 or 3 or 16 or 17 or 22 or 23 or 36 or 37, K={8}; and for the downlink slot m=4 or 5 or 12 or 13 or 24 or 25 or 32 or 33, K={6}. Or, for the downlink slot m=0 or 20, K={14, 13}; for the downlink slot m=1 or 21, K={13, 12}; for the downlink slot m=2 or 22, K={12, 11}; for the downlink slot m=3 or 23, K={9, 8}; and for the downlink slot m=4 or 24, K={6, 5}. Or, for the downlink slot m=0 or 20, K={12, 11}; for the downlink slot m=1 or 21, K={11, 10}; for the downlink slot m=2 or 22, K={10, 9}; for the downlink slot m=3 or 23, K={9, 8, 7}; and for the downlink slot m=4 or 24, K={7, 6, 5}. Or, for the downlink slot m=0 or 20, K={19, 18, 17, 16}; for the downlink slot m=1 or 21, K={16, 15, 14, 13}; for the downlink slot m=2 or 22, K={13, 12, 11, 10}; for the downlink slot m=3 or 23, K={10, 9, 8, 7}; and for the downlink slot m=4 or 24, K={7, 6, 5, 4}.

An embodiment of the disclosure provides a method for transmitting uplink data, the method includes: receiving, by a UE, uplink scheduling signaling transmitted by the network side according to predefined scheduling timing, and determining an uplink data transmission slot to transmit uplink data according to the uplink scheduling signaling; and transmitting, by the UE, the uplink data in the uplink data transmission slot. The slot is a temporal unit with a length shorter than 1 millisecond, and the predefined scheduling timing is: when the network side transmits the uplink scheduling signaling in a slot n, the UE transmits the uplink data to the network side in a slot n+l, where l∈L, n is an integer more than or equal to zero, l is an integer more than or equal to 1 and L represents a set of values of l.

Optionally, the length of the slot is seven OFDM symbols. For the downlink slot n=0 or 1 or 10 or 11, L={4}; for the downlink slot n=2 or 12, L={5, 7}; and for the downlink slot n=8 or 18, L={5}. Or for the downlink slot n=0 or 10, L={5}; for the downlink slot n=1 or 8 or 11 or 18, L={6}; and for the downlink slot n=2 or 6 or 12 or 16, L={7}. Or, for the downlink slot n=0 or 10, L={4}; for the downlink slot n=1 or 11, L={4, 6}; and for the downlink slot n=2 or 12, L={7, 11}. Or, for the downlink slot n=0 or 10, L={4, 5}; for the downlink slot n=1 or 11, L={5, 6}; and for the downlink slot n=2 or 12, L={6, 7}. Or, for the downlink slot n=0 or 10, L={4, 5, 6}; for the downlink slot n=1 or 11, L={6, 7, 8}; and for the downlink slot n=2 or 12, L={8, 9, 10, 11}.

Optionally the length of the slot is three OFDM symbols. For the downlink slot n=0 or 1 or 2 or 3 or 20 or 21 or 22 or 23, L={8}; for the downlink slot n=4 or 5 or 16 or 17 or 24 or 25 or 36 or 37, L={10}; and for the downlink slot n=12 or 13 or 32 or 33, L={6}. Or, for the downlink slot n=0 or 20, L={6, 7}; for the downlink slot n=1 or 21, L={7, 8}; for the downlink slot n=2 or 22, L={8, 9}; for the downlink slot n=3 or 23, L={11, 12}; and for the downlink slot n=4 or 24, L={14, 15}. Or, for the downlink slot n=0 or 20, L={8, 9}; for the downlink slot n=1 or 21, L={9, 10}; for the downlink slot n=2 or 22, L={10, 11}; for the downlink slot n=3 or 23, L={11, 12, 13}; and for the downlink slot n=4 or 24, L={13, 14, 15}. Or, for the downlink slot n=0 or 20, L={4, 5, 6, 7}; for the downlink slot n=1 or 21, L={7, 8, 9, 10}; for the downlink slot n=2 or 22, L={10, 11, 12, 13}; for the downlink slot n=3 or 23, L={13, 14, 15, 16}; and for the downlink slot n=4 or 24, L={16, 17, 18, 19}.

Optionally, after the UE transmits the uplink data in the uplink data transmission slot, the method further includes: receiving, by the UE, feedback for the uplink data transmitted by the network side according to predefined uplink data feedback timing. The predefined feedback timing is that when the network side receives the uplink data transmitted by the UE in a slot m−k, the network side transmits the feedback for the uplink data to the UE in a slot m, where k∈K, both m and k are integers more than or equal to zero, and K represents a set of values of k.

Optionally, the length of the slot is seven OFDM symbols. For the downlink slot m=0 or 1 or 10 or 11, K={7}; for the downlink slot m=2 or 12, K={5, 7}; and for the downlink slot m=8 or 18, K={9}. Or, for the downlink slot m=0 or 1 or 10 or 11, K={6}; for the downlink slot m=2 or 8 or 12 or 18, K={5}; and for the downlink slot m=6 or 16, K={7}. Or, for the downlink slot m=0 or 10, K={11}; for the downlink slot m=1 or 11, K={8, 7}; and for the downlink slot m=2 or 12, K={7, 5}. Or, for the downlink slot m=0 or 10, K={11, 6}; for the downlink slot m=1 or 11, K={6, 5}; and for the downlink slot m=2 or 12, K={5, 4}. Or, for the downlink slot m=0 or 10, K={11, 10, 9}; for the downlink slot m=1 or 11, K={9, 8, 7}; and for the downlink slot m=2 or 12, K={7, 6, 5, 4}.

Optionally, the length of the slot is three OFDM symbols. For the downlink slot m=0 or 1 or 20 or 21, K={10}; for the downlink slot m=2 or 3 or 16 or 17 or 22 or 23 or 36 or 37, K={8}; and for the downlink slot m=4 or 5 or 12 or 13 or 24 or 25 or 32 or 33, K={16}. Or, for the downlink slot m=0 or 20, K={14, 13}; for the downlink slot m=1 or 21, K={13, 12}; for the downlink slot m=2 or 22, K={12, 11}; for the downlink slot m=3 or 23, K={9, 8}; and for the downlink slot m=4 or 24, K={6, 5}. Or, for the downlink slot m=0 or 20, K={12, 11}; for the downlink slot m=1 or 21, K={11, 10}; for the downlink slot m=2 or 22, K={10, 9}; for the downlink slot m=3 or 23, K={9, 8, 7}; and for the downlink slot m=4 or 24, K={7, 6, 5}. Or, for the downlink slot m=0 or 20, K={19, 18, 17, 16}; for the downlink slot m=1 or 21, K={16, 15, 14, 13}; for the downlink slot m=2 or 22, K={13, 12, 11, 10}; for the downlink slot m=3 or 23, K={10, 9, 8, 7}; and for the downlink slot m=4 or 24, K={7, 6, 5, 4}.

An embodiment of the disclosure provides an apparatus for transmitting uplink data. The apparatus includes a determining unit configured to determine a size of a slot for transmitting data, and to transmit uplink scheduling signaling to a UE according to the size of the slot; and a receiving unit configured to receive uplink data transmitted by the UE according to predefined scheduling timing. The slot is a temporal unit with a length shorter than 1 millisecond, and the predefined scheduling timing is: when the determining unit transmits the uplink scheduling signaling in a slot n, the receiving unit receives the uplink data transmitted by the UE in a slot n+l, where l∈L, n is an integer more than or equal to zero, l is an integer greater than or equal to 1, and L represents a set of values of l.

Optionally the length of the slot is seven OFDM symbols. For the downlink slot n=0 or 1 or 10 or 11, L={4}; for the downlink slot n=2 or 12; L={5, 7}; and for the downlink slot n=8 or 18, L={5}. Or, for the downlink slot n=0 or 10, L={5}; for the downlink slot n=1 or 8 or 11 or 18, L={6}; and for the downlink slot n=2 or 6 or 12 or 16, L={7}. Or, for the downlink slot n=0 or 10, L={4}; for the downlink slot n=1 or 11, L={4, 6}; and for the downlink slot n=2 or 12, L={7, 11}. Or, for the downlink slot n=0 or 10, L={4, 5}; for the downlink slot n=1 or 11, L={5, 6}; and for the downlink slot n=2 or 12, L={6, 7}. Or, for the downlink slot n=0 or 10, L={4, 5, 6}; for the downlink slot n=1 or 11, L={6, 7, 8}; and for the downlink slot n=2 or 12, L={8, 9, 10, 11}.

Optionally the length of the slot is three OFDM symbols. For the downlink slot n=0 or 1 or 2 or 3 or 20 or 21 or 22 or 23, L={8}; for the downlink slot n=4 or 5 or 16 or 17 or 24 or 25 or 36 or 37, L={10}; and for the downlink slot n=12 or 13 or 32 or 33, L={6}. Or, for the downlink slot n=0 or 20, L={6, 7}; for the downlink slot n=1 or 21, L={7, 8}; for the downlink slot n=2 or 22, L={8, 9}; for the downlink slot n=3 or 23, L={11, 12}; and for the downlink slot n=4 or 24, L={14, 15}. Or, for the downlink slot n=0 or 20, L={8, 9}; for the downlink slot n=1 or 21, L={9, 10}; for the downlink slot n=2 or 22, L={10, 11}; for the downlink slot n=3 or 23, L={11, 12, 13}; and for the downlink slot n=4 or 24, L={13, 14, 15}. Or, for the downlink slot n=0 or 20, L={4, 5, 6, 7}; for the downlink slot n=1 or 21, L={7, 8, 9, 10}; for the downlink slot n=2 or 22, L={10, 11, 12, 13}; for the downlink slot n=3 or 23, L={13, 14, 15, 16}; and for the downlink slot n=4 or 24, L={16, 17, 18, 19}.

Optionally the determining unit is further configured to transmit feedback for the uplink data to the UE according to predefined uplink data feedback timing after the receiving unit receives the uplink data transmitted by the UE according to the predefined scheduling timing. The predefined feedback timing is that when the receiving unit receives uplink data transmitted by the UE in a slot m−k, the determining unit transmits feedback for the uplink data to the UE in a slot m, where k∈K, both m and k are integers more than or equal to zero, and K represents a set of values of k.

Optionally the length of the slot is seven OFDM symbols. For the downlink slot m=0 or 1 or 10 or 11, K={7}; for the downlink slot m=2 or 12, K={5, 7}; and for the downlink slot m=8 or 18, K={9}. Or, for the downlink slot m=0 or 1 or 10 or 11, K={6}; for the downlink slot m=2 or 8 or 12 or 18, K={5}; and for the downlink slot m=6 or 16, K={7}. Or, for the downlink slot m=0 or 10, K={11}; for the downlink slot m=1 or 11, K={8, 7}; and for the downlink slot m=2 or 12, K={7, 5}. Or, for the downlink slot m=0 or 10, K={11, 6}; for the downlink slot m=1 or 11, K={6, 5}; and for the downlink slot m=2 or 12, K={5, 4}. Or, for the downlink slot m=0 or 10. K={11, 10, 9}; for the downlink slot m=1 or 11, K={9, 8, 7}; and for the downlink slot m=2 or 12, K={7, 6, 5, 4}.

Optionally the length of the slot is three OFDM symbols. For the downlink slot m=0 or 1 or 20 or 21, K={10}; for the downlink slot m=2 or 3 or 16 or 17 or 22 or 23 or 36 or 37, K={8}; and for the downlink slot m=4 or 5 or 12 or 13 or 24 or 25 or 32 or 33, K={6}. Or, for the downlink slot m=0 or 20, K={14, 13}; for the downlink slot m=1 or 21, K={13, 12}; for the downlink slot m=2 or 22, K={12, 11}; for the downlink slot m=3 or 23, K={9, 8}; and for the downlink slot m=4 or 24, K={6, 5}. Or, for the downlink slot m=0 or 20, K={12, 11}; for the downlink slot m=1 or 21, K={11, 10}; for the downlink slot m=2 or 22, K={10, 9}; for the downlink slot m=3 or 23, K={9, 8, 7}; and for the downlink slot m=4 or 24, K={7, 6, 5}. Or, for the downlink slot m=0 or 20, K={19, 18, 17, 16}; for the downlink slot m=1 or 21, K={16, 15, 14, 13}; for the downlink slot m=2 or 22, K={13, 12, 11, 10}; for the downlink slot m=3 or 23, K={10, 9, 8, 7}; and for the downlink slot m=4 or 24, K={7, 6, 5, 4}.

An embodiment of the disclosure provides an apparatus for transmitting uplink data. The apparatus includes a receiving unit configured to receive uplink scheduling signaling transmitted by a network side according to predefined scheduling timing, and to determine an uplink data transmission slot to transmit uplink data according to the uplink scheduling signaling; and a transmitting unit configured to transmit the uplink data in the uplink data transmission slot. The slot is a temporal unit with a length shorter than 1 millisecond, and the predefined scheduling timing is: when the network side transmits the uplink scheduling signaling in a slot n, the transmitting unit transmits the uplink data to the network side in a slot n+l, where l∈L, n is an integer more than or equal to zero, l is an integer more than or equal to 1 and L represents a set of values of l.

Optionally the length of the slot is seven OFDM symbols. For the downlink slot n=0 or 1 or 10 or 11, L={4}; for the downlink slot n=2 or 12, L={5, 7}; and for the downlink slot n=8 or 18, L={5}. Or, for the downlink slot n=0 or 10, L={5}; for the downlink slot n=1 or 8 or 11 or 18, L={6}; and for the downlink slot n=2 or 6 or 12, or 16, L={7}. Or, for the downlink slot n=0 or 10, L={4}; for the downlink slot n=1 or 11, L={4, 6}; and for the downlink slot n=2 or 12, L={7, 11}. Or, for the downlink slot n=0 or 10, L={4, 5}; for the downlink slot n=1 or 11, L={5, 6}; and for the downlink slot n=2 or 12, L={6, 7}. Or, for the downlink slot n=0 or 10, L={4, 5, 6}; for the downlink slot n=1 or 11, L={6, 7, 8}; and for the downlink slot n=2 or 12, L={8, 9, 10, 11}.

Optionally the length of the slot is three OFDM symbols. For the downlink slot n=0 or 1 or 2 or 3 or 20 or 21 or 22 or 23, L={8}; for the downlink slot n=4 or 5 or 16 or 17 or 24 or 25 or 36 or 37, L={10}; and for the downlink slot n=12 or 13 or 32 or 33, L={6}. Or, for the downlink slot n=0 or 20, L={6, 7}; for the downlink slot n=1 or 21, L={7, 8}; for the downlink slot n=2 or 22, L={8, 9}; for the downlink slot n=3 or 23, L={11, 12}; and for the downlink slot n=4 or 24, L={14, 15}. Or, for the downlink slot n=0 or 20, L={8, 9}; for the downlink slot n=1 or 21, L={9, 10}; for the downlink slot n=2 or 22, L={10, 11}; for the downlink slot n=3 or 23, L={11, 12, 13}; and for the downlink slot n=4 or 24, L={13, 14, 15}. Or, for the downlink slot n=0 or 20, L={4, 5, 6, 7}; for the downlink slot n=1 or 21, L={7, 8, 9, 10}; for the downlink slot n=2 or 22, L={10, 11, 12, 13}; for the downlink slot n=3 or 23, L={13, 14, 15, 16}; and for the downlink slot n=4 or 24, L={16, 17, 18, 19}.

Optionally after the transmitting unit transmits the uplink data in the uplink data transmission slot, the receiving unit is further configured to receive feedback for the uplink data transmitted by the network side according to predefined uplink data feedback timing. The predefined feedback timing is that when the network side receives the uplink data transmitted by the transmitting unit in a slot m−k, the network side transmits feedback for the uplink data to the apparatus for transmitting uplink data, in a slot m, where k∈K, both m and k are integers more than or equal to zero, and K represents a set of values of k.

Optionally the length of the slot is seven OFDM symbols. For the downlink slot m=0 or 1 or 10 or 11, K={7}; for the downlink slot m=2 or 12, K={5, 7}; and for the downlink slot m=8 or 18, K={9}. Or, for the downlink slot m=0 or 1 or 10 or 11, K={6}; for the downlink slot m=2 or 8 or 12 or 18, K={5}; and for the downlink slot m=6 or 16, K={7}. Or, for the downlink slot m=0 or 10, K={11}; for the downlink slot m=1 or 11; K={8, 7}; and for the downlink slot m=2 or 12, K={7, 5}. Or, for the downlink slot m=0 or 10, K={11, 6}; for the downlink slot m=1 or 11, K={6, 5}; and for the downlink slot m=2 or 12, K={5, 4}. Or, for the downlink slot m=0 or 10, K={11, 10, 9}; for the downlink slot m=1 or 11, K={9, 8, 7}; and for the downlink slot m=2 or 12, K={7, 6, 5, 4}.

Optionally the length of the slot is three OFDM symbols. For the downlink slot m=0 or 1 or 20 or 21, K {10}; for the downlink slot m=2 or 3 or 16 or 17 or 22 or 23 or 36 or 37, K={8}; and for the downlink slot m=4 or 5 or 12 or 13 or 24 or 25 or 32 or 33, K={6}. Or, for the downlink slot m=0 or 20, K={14, 13}; for the downlink slot m=1 or 21, K={13, 12}; for the downlink slot m=2 or 22, K={12, 11}; for the downlink slot m=3 or 23, K={9, 8}; and for the downlink slot m=4 or 24, K={6, 5}. Or, for the downlink slot m=0 or 20, K={12, 11}; for the downlink slot m=1 or 21, K={11, 10}; for the downlink slot m=2 or 22, K={10, 9}; for the downlink slot m=3 or 23, K={9, 8, 7}; and for the downlink slot m=4 or 24, K={7, 6, 5}. Or, for the downlink slot m=0 or 20, K={13, 18, 17, 16}; for the downlink slot m=1 or 21, K={16, 15, 14, 13}; for the downlink slot m=2 or 22, K={13, 12, 11, 10}; for the downlink slot m=3 or 23, K={10, 9, 8, 7}; and for the downlink slot m=4 or 24, K={7, 6, 5, 4}.

An embodiment of the disclosure provides an apparatus for transmitting uplink data. The apparatus includes a processor, a transceiver, and a memory. The processor is configured to read and execute a program in the memory to: determine a size of a slot for transmitting data, and transmit uplink scheduling signaling to a UE according to the size of the slot; and receive uplink data transmitted by the UE through the transceiver according to predefined scheduling timing. The slot is a temporal unit with a length shorter than 1 millisecond, and the predefined scheduling timing is: when the apparatus for transmitting the uplink data transmits uplink scheduling signaling in a slot n, the apparatus for transmitting uplink data receives the uplink data transmitted by the UE in a slot where n+l, n is an integer more than or equal to zero, l is an integer greater than or equal to 1, and L represents a set of values of l.

An embodiment of the disclosure provides an apparatus for transmitting uplink data. The apparatus includes a processor, a transceiver, and a memory. The processor is configured to read and execute a program in the memory to: receive uplink scheduling signaling transmitted by the network side according to predefined scheduling timing through the transceiver, and determine an uplink data transmission slot to transmit uplink data according to the uplink scheduling signaling; and transmit the uplink data in the uplink data transmission slot through the transceiver. The slot is a temporal unit with a length shorter than 1 millisecond, and the predefined scheduling timing is: when the network side transmits the uplink scheduling signaling in a slot n, the apparatus for transmitting uplink data transmits the uplink data to the network side in a slot n+l, where l∈L, n is an integer more than or equal to zero, l is an integer more than or equal to 1, and L represents a set of values of l.

BRIEF DESCRIPTION OF THE DRAWINGS

FIG. 1 is a schematic diagram of an existing uplink HARQ MT model.

FIG. 2 is a schematic flow chart of a method for transmitting uplink data at a network side according to an embodiment of the disclosure.

FIG. 3 is a timing diagram of uplink HARQ feedback according to an embodiment of the disclosure.

FIG. 4 is a timing diagram of uplink HARQ feedback according to an embodiment of the disclosure.

FIG. 5 is another timing diagram of uplink HARQ feedback according to an embodiment of the disclosure.

FIG. 6 is another timing diagram of uplink HARQ feedback according to an embodiment of the disclosure.

FIG. 7 is another timing diagram of uplink HARQ feedback according to an embodiment of the disclosure.

DETAILED DESCRIPTION OF THE EMBODIMENTS

Figure 8:
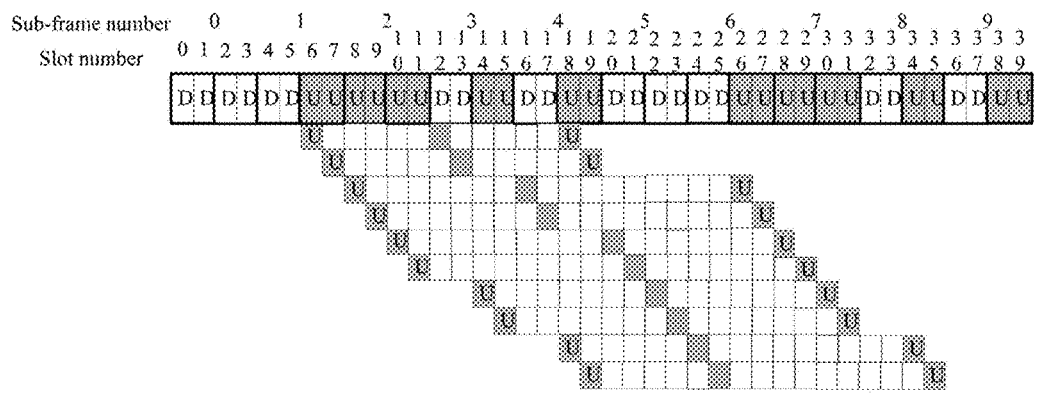
FIG. 8 is another timing diagram of uplink HARQ feedback according to an embodiment of the disclosure.

Embodiments of the disclosure provide a method and apparatus for transmitting uplink data so as to shorten RTT during transmission in a short slot to shorten a user-plane delay and improve the performance of a system.

Referring to FIG. 2, a method for transmitting uplink data according to an embodiment of the disclosure at a network side, e.g., a base station side, includes the following operations.

In the operation S101, the network side determines a size of a slot for transmitting data, and transmits uplink scheduling signaling to a UE according to the size of the slot.

In the operation S102, the network side receives uplink data transmitted by the UE according to predefined scheduling timing.

The slot for transmitting data is a temporal unit shorter than 1 millisecond. And the predefined scheduling timing is: when the network side transmits uplink scheduling signaling in a slot n, the network side receives uplink data transmitted by the UE in a slot n+l. l∈L, n is an integer more than or equal to zero, l is an integer greater than or equal to 1, and L represents a set of values of l.

With this method, the UE transmitting in a short slot can prepare the uplink data more quickly after reception of the uplink scheduling signaling transmitted by the network side, and the network side can also decode a received uplink data packet and make feedback or schedule re-transmission more quickly, thus shortening RTT during transmission in the short slot, shortening a user-plane delay, and improving the performance of the system.

According to the embodiments of the disclosure, each sub-frame includes one or more slots, and the length of each slot is pre-configured by the system. The scheduling timing according to the embodiments of the disclosure refers to that the base station transmits, in the downlink slot n, uplink scheduling signaling (to schedule initial transmission or re-transmission) for the uplink slot n+l, where l∈L. A feedback timing according to the embodiments of the disclosure refers to that the base station makes feedback for an uplink slot m−k in a downlink slot m, where k∈K. Each embodiment of the disclosure gives a set of values of L and a set of values of K, so specific meanings of L and K are not described respectively again. The scheduling timing according to the embodiments of the disclosure indicates a correspondence relationship between a slot occupied by uplink scheduling signaling transmitted by the network side and a slot to be occupied by uplink data transmitted by the UE as instructed by the uplink scheduling signaling. The feedback timing according to the embodiments of the disclosure indicates a correspondence relationship between a slot occupied by feedback transmitted by the network side for uplink data after reception of the uplink data and a slot occupied by the uplink data transmitted by the UE.

It shall be noted that, according to the embodiments of the disclosure, when n+l is greater than P, the base station performs uplink scheduling in the slot n for a slot n+l−P in the succeeding frame, where P represents the total number of slots in a radio frame; and when m−k is smaller than zero, the base station transmits, in the slot in, feedback for uplink data transmitted by the UE in the |m−k|-th last slot in the preceding frame.

In the embodiments of the disclosure, when a slot occupies seven OFDM symbols, each radio frame includes 20 slots numbered from 0 to 19, i.e., a slot 0, a slot 1, a slot 2, . . . , and a slot 19; and when a slot occupies three OFDM symbols, each radio frame includes 40 slots numbered from 0 to 39, i.e., a slot 0, a slot 1, a slot 2, . . . , and a slot 39.

First Embodiment

A slot pre-configured in the system occupies seven OFDM symbols, where the slot 3, the slot 4, the slot 5, the slot 7, the slot 9, the slot 13, the slot 14, the slot 15, the slot 17, and the slot 19 are uplink slots. The specific uplink HARQ timing is illustrated by FIG. 3, which shows specific scheduling and feedback timing corresponding to each uplink slot in a half of a radio frame (i.e., the slot 3, the slot 4, the slot 5, the slot 7, and the slot 9), and a sub-frame includes two slots occupying 14 OFDM symbols.

The scheduling timing is that for the downlink slot n=0, 1, 10, or 11, L={4}, for the downlink slot n=2 or 12, L={5, 7}, and for the downlink slot n=8 or 18, L={5}.

In other words, referring to FIG. 3, taking slots corresponding to the sub-frame 5 to the sub-frame 9 in the second half of a frame as an example (the same applies to the first half of the frame), in this embodiment, the base station transmits uplink scheduling signaling to the UE in the slot 10 to instruct the UE to transmit uplink data in the slot 14; the base station transmits uplink scheduling signaling to the UE in the slot 11 to instruct the UE to transmit uplink data in the slot 15; the base station transmits uplink scheduling signaling to the UE in the slot 12 to instruct the UE to transmit uplink data in the slot 17 and/or the slot 19; and the base station transmits uplink scheduling signaling to the UE in the slot 18 to instruct the UE to transmit uplink data in the slot 3 (i.e., 18+5−20) of the succeeding frame, where the slot 3 is determined as follows: when n+l is more than P, the base station performs uplink scheduling in the slot n for the slot n+l−P of the succeeding frame, and P represents the total number of slots in a radio frame. In this embodiment, P equals to 20. Of course, the value of P can alternatively be preset to be another value, although this embodiment is not limited thereto.

In the embodiment of the disclosure, when the predefined scheduling timing is applied to asynchronous HARQ, the uplink scheduling signaling further includes an HARQ process information field indicating an HARQ process number.

When the number of uplink HARQ processes is N, the HARQ process information field includes $\lceil \log_2 N \rceil$ of bits.

When the network side schedules a plurality of uplink slots in a downlink slot, the uplink scheduling signaling includes a UL index information field indicating multi-slot scheduling.

When at most M uplink slots can be scheduled in a downlink slot, the number of bits the UL index information field includes is $\lceil \log_2 M \rceil$.

The feedback timing is that for the downlink slot m=0, 1, 10, or 11, K={7}; for the downlink slot m=2 or 12, K={5, 7}; and for the downlink slot m=8 or 18. K={9}; and when the network side makes feedback for a plurality of uplink slots in a downlink slot, the network side makes feedback over different PHICH resources for uplink data in different slots.

The PHICH resources can be conventional PHICH resources, or can be EPHICH resources different from conventional PHICH resources.

It shall be noted that, according to the scheduling timing in the embodiment of the disclosure, a correspondence relationship between a slot occupied by uplink scheduling signaling of initial transmission or re-transmission transmitted by the network side, and a slot to be occupied by uplink data transmitted by the UE as instructed by the uplink scheduling signaling can be determined, and a correspondence relationship between a slot occupied by feedback transmitted by the network side and a slot occupied by uplink data re-transmission of the UE according to the feedback can also be determined.

In this embodiment, for a same uplink slot, the downlink scheduling slot n and the downlink feedback slot m thereof are different slots, and for different uplink slots, their scheduling slots n and feedback slots m may be the same slot, and the same applies to the embodiments below, although a repeated description thereof is omitted.

In other words, referring to FIG. 3, taking slots corresponding to the sub-frame 5 to the sub-frame 9 in the second half of a frame as an example (the same applies to the first half of a frame), in this embodiment, the base station transmits, in the slot 10, feedback for uplink data transmitted by the UE in the slot 3; the base station transmits, in the slot 11, feedback for uplink data transmitted by the UE in the slot 4; the base station transmits, in the slot 12, feedback for uplink data transmitted by the UE in the slot 5 and/or in the slot 7; and the base station transmits, in the slot 18, feedback for uplink data transmitted by the UE in the slot 9.

In the embodiment of the disclosure, when m−k is smaller than zero, the base station transmits, in the slot m, feedback for uplink data transmitted by the UE in the ||m−k||-th last slot in the preceding frame.

The scheduling timing and the feedback timing in this embodiment do not need to be applied together, that is, when uplink scheduling is performed according to the scheduling timing in this embodiment, feedback for uplink data does not have to be made according to the feedback timing in this embodiment, and the same applies to the embodiments below; although a repeated description thereof is omitted.

Furthermore in the timing diagrams according to the embodiment of the disclosure, the first uplink slot in each process (i.e., the first box marked with U in each line under the line of the sub-frame structure of each timing diagram) represents a slot of initial transmission, a slot corresponding to the block in gray that immediately follows represents a slot occupied by feedback for uplink data or a slot occupied by scheduling signaling of re-transmission, and the last uplink slot (the last box with U in each line under the line of the sub-frame structure of each timing diagram) represents a slot occupied by retransmitted uplink data. In the schematic diagram according to the embodiment of the disclosure, only HARQ timing corresponding to the first half of a radio frame is illustrated. Since an uplink-downlink slot configuration in the first half of a radio frame is the same as that in the second half of the radio frame, when the length of the slot is seven OFDM symbols, HARQ timing of the slot n in the first half of the frame is the same as that of the corresponding slot n+10 in the second half of the frame, and when the length of the slot is three OFDM symbols, HARQ timing of the slot n in the first half of the frame is the same as that of the corresponding slot n+20 in the second half of the frame. Uplink HARQ timing in the second half of the radio frame can be determined from uplink HARQ timing in the first half of the radio frame. As illustrated by FIG. 3, for example, HARQ timing of the slot 3 is the same as that of the slot 13; HARQ timing of the slot 4 is the same as that of the slot 14, HARQ timing of the slot 5 is the same as that of the slot 15, HARQ timing of the slot 7 is the same as that of the slot 17, and HARQ timing of the slot 9 is the same as that of the slot 19. The same applies to the embodiments described below of the disclosure, so their schematic diagrams only illustrate HARQ timing of the first half of a radio frame, although a repeated description thereof is omitted.

In the schematic diagram according to the embodiment of the disclosure, an illustrated process only represents an HARQ timing relationship for scheduling or feedback of uplink data, and the number of processes does not represent a real quantity of uplink HARQ processes, but the real quantity of uplink HARQ processes shall be determined according to the number of uplink sub-frames in the longest RTT. The same applies to the embodiments described below, although a repeated description thereof is omitted.

Second Embodiment

Figures 4, 5, 6, 7:
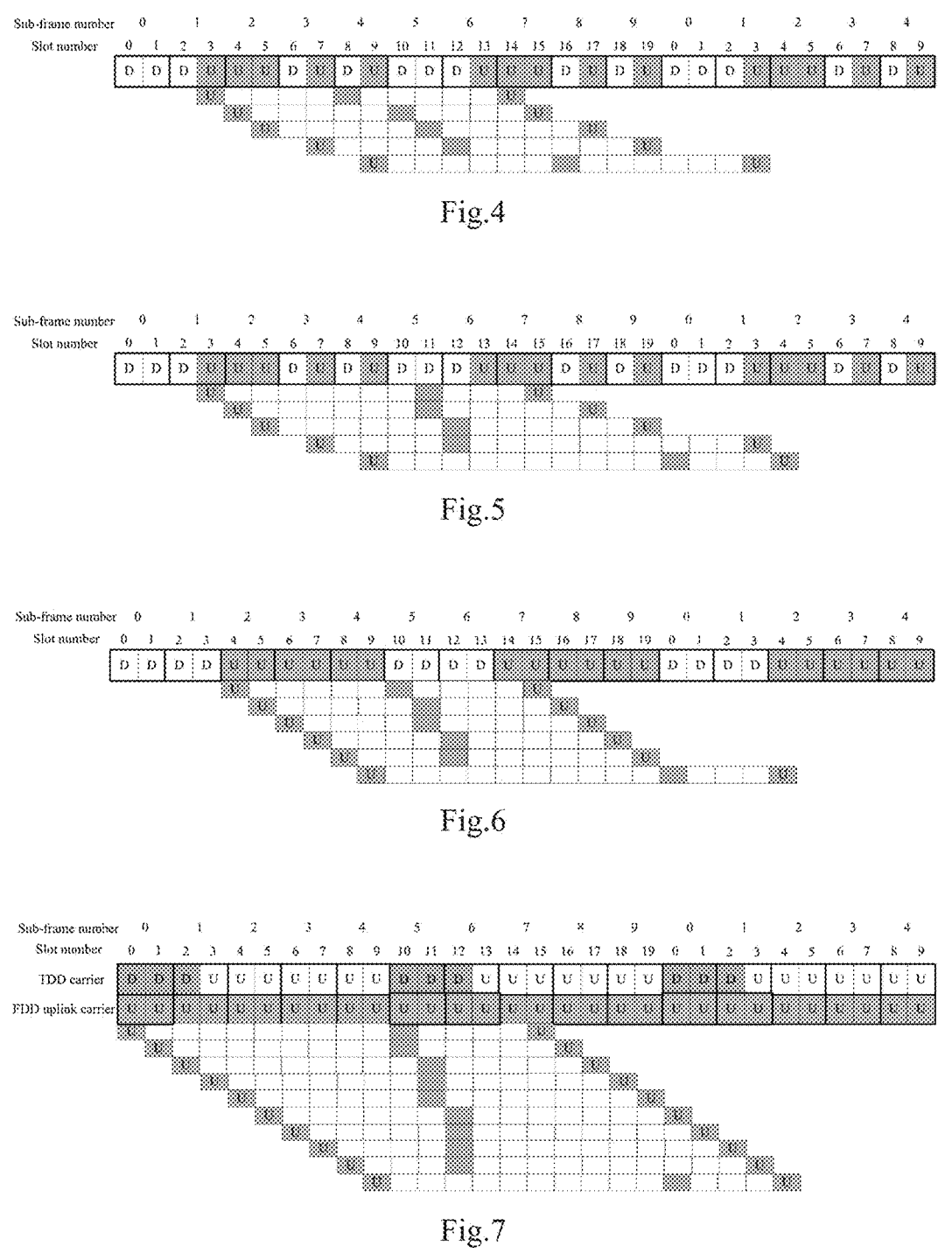

A slot pre-configured in the system occupies seven OFDM symbols, where the slot 3, the slot 4, the slot 5, the slot 7, the slot 9, the slot 13, the slot 14, the slot 15, the slot 17, and the slot 19 are uplink slots. Specific uplink HARQ timing is illustrated by FIG. 4, and each process includes scheduling and feedback timing of particular slots.

The scheduling timing is that for the downlink slot n=0 or 10, L={5}; for the downlink slot n=1 or 8 or 11 or 18, L={6}; and for the downlink slot n=2 or 6 or 12 or 16, L={7}.

The feedback timing is that for the downlink slot n=0 or 1 or 10 or 11, K={6}; for the downlink slot n=2 or 8 or 12 or 18, K={5}; and for the downlink slot n=6 or 16, K={7}.

Third Embodiment

A slot pre-configured in the system occupies seven OFDM symbols, where the slot 3, the slot 4, the slot 5, the slot 7, the slot 9, the slot 13, the slot 14, the slot 15, the slot 17, and the slot 19 are uplink slots. Specific uplink HARQ timing is illustrated by FIG. 5, and each process includes scheduling and feedback timing of particular slots.

The scheduling timing is that for the downlink slot n=0 or 10, L={4}; for the downlink slot n=1 or 11, L={4, 6}; and for the downlink slot n=2 or 12, L={7, 11}.

The feedback timing is that for the downlink slot n=0 or 10, K={11}; for the downlink slot n=2 or 12, K={5, 7}; and for the downlink slot n=1 or 11, K={7, 8}.

Fourth Embodiment

A slot pre-configured in the system occupies seven OFDM symbols, where the slot 4, the slot 5, the slot 6, the slot 7, the slot 8, the slot 9, the slot 14, the slot 15, the slot 16, the slot 17, the slot 18, and the slot 19 are uplink slots. Specific uplink HARQ timing is illustrated by FIG. 6, and each process includes scheduling and feedback timing of particular slots.

The scheduling timing is that for the downlink slot n=0 or 10, L={4, 5}; for the downlink slot n=1 or 11, L={5, 6}; and for the downlink slot n=2 or 12, L={6, 7}.

The feedback timing is that for the downlink slot n=0 or 10, K={11, 6}; for the downlink slot n=1 or 11, K={6, 5}, and for the downlink slot n=2 or 12, K={5, 4}.

Fifth Embodiment

A slot pre-configured in the system occupies seven OFDM symbols, and when TDD and FDD carriers are aggregated, the TDD carrier is a primary carrier, and scheduling is performed across the carriers, scheduling signaling and feedback of the FDD carrier needs to be transmitted over the TDD carrier. Feedback or scheduling signaling of re-transmission can be transmitted in the slot 0, the slot 1, the slot 2, the slot 10, the slot 11, and the slot 12 over the TDD carrier, particular uplink HARQ timing of the FDD carrier is as illustrated by FIG. 7, and each process includes scheduling and feedback timing of particular slots.

The scheduling timing is that for the downlink slot n=0 or 10, L={4, 5, 6}; for the downlink slot n=1 or 11, L={6, 7, 8}; and for the downlink slot n=2 or 12, L={8, 9, 10, 11}.

The feedback timing is that for the downlink slot n=0 or 10, K={11, 10, 9}; for the downlink slot n=1 or 11, K={9, 8, 7}; and for the downlink slot n=2 or 12, K={7, 6, 5, 4}.

Sixth Embodiment

A slot pre-configured in the system occupies three OFDM symbols, where the slots 6 to 11, the slot 14, the slot 15, the slot 18, the slot 19, the slots 26 to 31, the slot 35, the slot 36, the slot 38, and the slot 39 are uplink slots. Particular uplink HARQ timing is illustrated by FIG. 8, and each process includes scheduling and feedback timing of particular slots.

The scheduling tuning is that for the downlink slot n=0 or 1 or 2 or 3 or 20 or 21 or 22 or 23, L={8}; for the downlink slot n=4 or 5 or 16 or 17 or 24 or 25 or 36 or 37, L={10}; and for the downlink slot n=12 or 13 or 32 or 33, L={6}.

The feedback timing is that for the downlink slot n=0 or 1 or 20 or 21, K={10}; for the downlink slot n=2 or 3 or 16 or 17 or 22 or 23 or 36 or 37, K={8}; and for the downlink slot n=4 or 5 or 12 or 13 or 24 or 25 or 32 or 33, K={6}.

Seventh Embodiment

Figure 9:
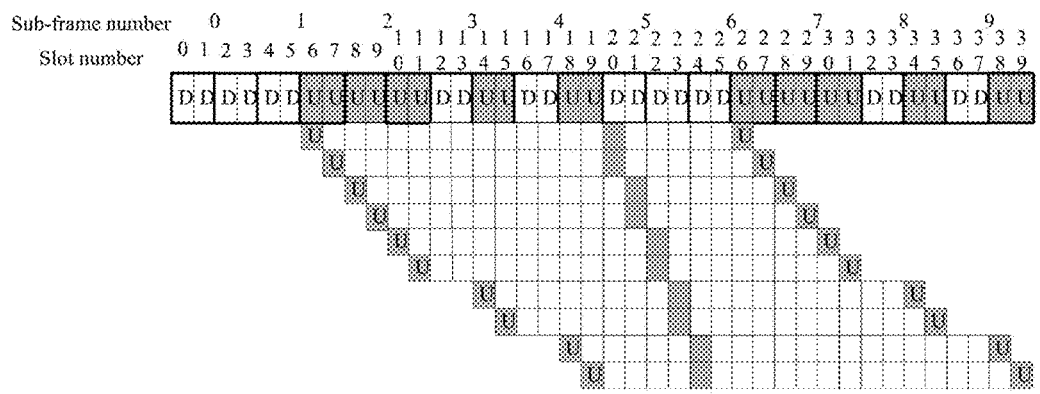
FIG. 9 is another timing diagram of uplink HARQ feedback according to an embodiment of the disclosure.

A slot pre-configured in the system occupies three OFDM symbols, where the slots 6 to 11, the slot 14, the slot 15, the slot 18, the slot 19, the slots 26 to 31, the slot 35, the slot 36, the slot 38, and the slot 39 are uplink slots. Particular uplink HARQ timing is illustrated by FIG. 9, and each process includes scheduling and feedback timing of particular slots.

The scheduling timing is that for the downlink slot n=0 or 20, L={6, 7}; for the downlink slot n=1 or 21, L={7, 8}; for the downlink slot n=2 or 22, L={8, 9}; for the downlink slot n=3 or 23, L={11, 12}; and for the downlink slot n=4 or 24, L={14, 15}.

The feedback timing is that for the downlink slot n=0 or 20, K={14, 13}; for the downlink slot n=1 or 21, K={13, 12}; for the downlink slot n=2 or 22, K={12, 11}; for the downlink slot n=3 or 23, K={9, 8}; and for the downlink slot n=4 or 24, K={6, 5}.

Eighth Embodiment

Figure 10:
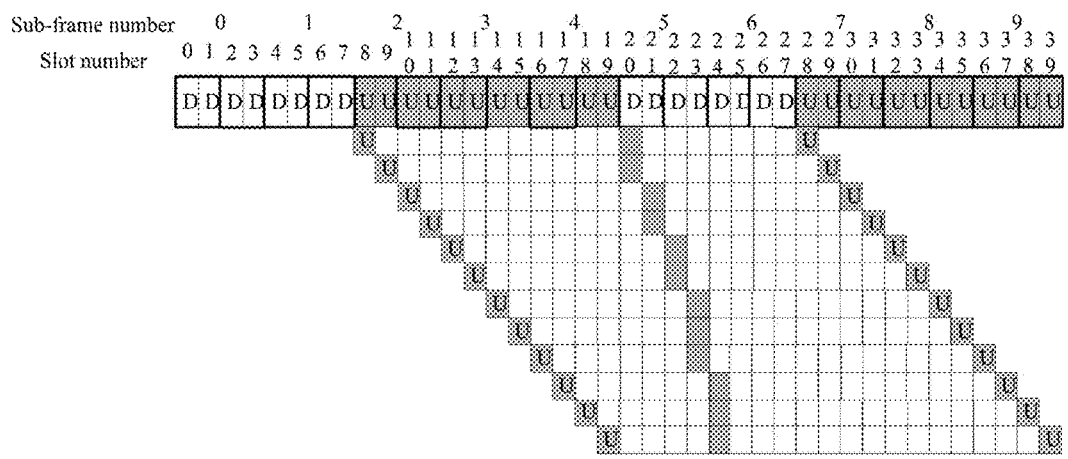
FIG. 10 is another timing diagram of uplink HARQ feedback according to an embodiment of the disclosure.

A slot pre-configured in the system occupies three OFDM symbols, where the slots 8 to 19, and the slots 28 to 39 are uplink slots. Particular uplink HARQ timing is illustrated by FIG. 10, and each process includes scheduling and feedback timing of particular slots.

The scheduling timing is that for the downlink slot n=0 or 20, L={8, 9}; for the downlink slot n=1 or 21, L={9, 10}; for the downlink slot n=2 or 22, L={10, 11}; for the downlink slot n=3 or 23, L={11, 12, 13}; and for the downlink slot n=4 or 24, L={13, 14, 15}.

The feedback timing is that for the downlink slot n=0 or 20, K={12, 11}; for the downlink slot n=1 or 21, K={11, 10}; for the downlink slot n=2 or 22, K={10, 9}; for the downlink slot n=3 or 23, K={9, 8, 7}; and for the downlink slot n=4 or 24, K={7, 6, 5}.

Ninth Embodiment

Figure 11:
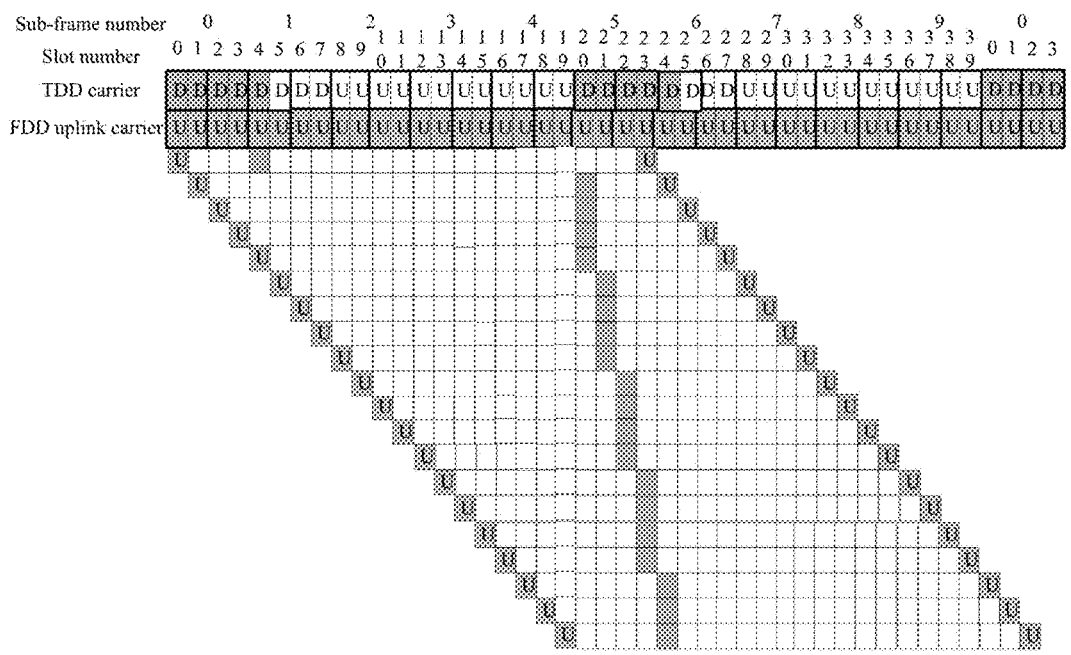
FIG. 11 is another timing diagram of uplink HARQ feedback according to an embodiment of the disclosure.

A slot pre-configured in the system occupies three OFDM symbols, and when TDD and FDD carriers are aggregated, the TDD carrier is a primary carrier, and scheduling is performed across the carriers, scheduling signaling and feedback of the MD carrier needs to be transmitted over the TDD carrier. Feedback or scheduling signaling of re-transmission can be transmitted in the slots 0 to 4 and the slot 20 to 24 over the TDD carrier, particular uplink HARQ timing of the FDD carrier is illustrated by FIG. 11, and each process includes scheduling and feedback timing of particular slots.

The scheduling timing is that for the downlink slot n=0 or 20, L={4, 5, 6, 7}; for the downlink slot n=1 or 21, L={7, 8, 9, 10}; for the downlink slot n=2 or 22, L={10, 11, 12, 13}; for the downlink slot n=3 or 23, L={13, 14, 15, 16}; and for the downlink slot n=4 or 24, L={16, 17, 18, 19}.

The feedback timing is that for the downlink slot n=0 or 20, K={19, 18, 17, 16}; for the downlink slot n=1 or 21, K={16, 15, 14, 13}; for the downlink slot n=2 or 22, K={13, 12, 11, 10}; for the downlink slot n=3 or 23, K={10, 9, 8, 7}; and for the downlink slot n=4 or 24, K={7, 6, 5, 4}.

It shall be further noted that the uplink HARQ timing defined in the embodiments of the disclosure can be applicable to synchronous HARQ or asynchronous HARQ. When the uplink HARQ timing is applied to asynchronous HARQ, only the scheduling timing defined in the embodiments of the disclosure needs to be used, and also an HARQ process information field is added to the uplink scheduling signaling to indicate an HARQ process number (the number of bits in the HARQ process information field relates to the particular number of processes, and the number of processes is the largest number of uplink sub-frames in an RTT). When the uplink HARQ timing is applied to synchronous HARQ, both the scheduling timing and the feedback timing defined in the embodiments of the disclosure are applied, and feedback can be made over an existing PHICH resource or a defined new EPHICH resource.

When a plurality of uplink slots are scheduled in a downlink slot, a UL index information field can be added to corresponding uplink scheduling signaling to indicate multi-slot scheduling. The number of UL index bits for multi-slot scheduling can be determined according to the largest number of slots scheduled by the network side in all the downlink slots; or can be preset per slot, that is, determined respectively according to the number of uplink slots scheduled in each downlink slots. When a plurality of uplink slots are fed back in a downlink slot, the specific uplink slots being fed back can be determined using different PHICH or EPHICH resources.

The UE side receives the uplink scheduling signaling transmitted by the base station side, and then transmits the uplink data according to the predefined scheduling timing, and detects the feedback or the scheduling signaling of re-transmission in a slot according to the predefined feedback timing.

Figure 12:
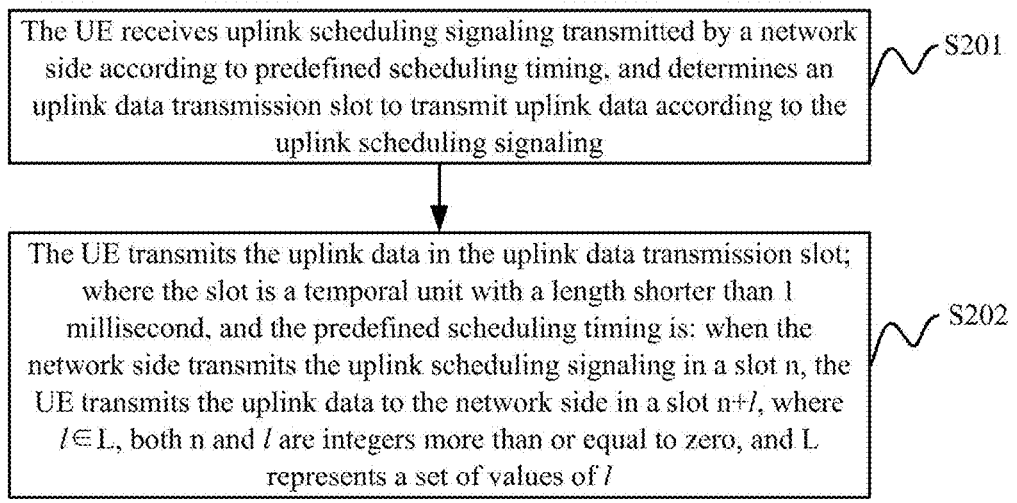
FIG. 12 is a schematic flow chart of a method for transmitting uplink data at a UE side according to an embodiment of the disclosure.

Accordingly, referring to FIG. 12, a method for transmitting uplink data according to an embodiment of the disclosure at the UE side includes the following operations.

In the operation S201, the UE receives uplink scheduling signaling transmitted by a network side according to predefined scheduling timing, and determines an uplink data transmission slot to transmit uplink data, according to the uplink scheduling signaling.

In the operation S202, the UE transmits the uplink data in the uplink data transmission slot.

The slot is a temporal unit with a length shorter than 1 millisecond, and the predefined scheduling timing is: when the network side transmits uplink scheduling signaling in a slot n, the UE transmits uplink data to the network side in a slot n+l, where l∈L, n is an integer more than or equal to zero, l is an integer greater than or equal to 1, and L represents a set of values of l.

Optionally when the length of the slot is seven OFDM symbols, in some embodiments, for the downlink slot n=0 or 1 or 10 or 11, L={4}; for the downlink slot n=2 or 12, L={5, 7}; and for the downlink slot n=8 or 18, ={5}.

Optionally when the length of the slot is seven OFDM symbols, in some other embodiments, for the downlink slot n=0 or 10, L={5}; for the downlink slot n=1 or 8 or 11 or 18, L={6}; and for the downlink slot n=2 or 6 or 12 or 16, L={7}.

Optionally when the length of the slot is seven OFDM symbols, in some other embodiments, for the downlink slot n=0 or 10, L={4}; for the downlink slot n=1 or 11, L={4, 6}; and for the downlink slot n=2 or 12, L={7, 11}.

Optionally when the length of the slot is seven OFDM symbols, in some other embodiments, for the downlink slot n=0 or 10, L={4, 5}; for the downlink slot n=1 or 11, L={5, 6}; and for the downlink slot n=2 or 12. L={6, 7}.

Optionally when the length of the slot is seven OFDM symbols, in some other embodiments, for the downlink slot n=0 or 10, L={4, 5, 6}; for the downlink slot n=1 or 11, L={16, 7, 8}; and for the downlink slot n=2 or 12, {8, 9, 10, 11}.

Optionally when the length of the slot is three OFDM symbols, in some embodiments, for the downlink slot n=0 or 1 or 2 or 3 or 20 or 21 or 22 or 23, L={8}; for the downlink slot n=4 or 5 or 16 or 17 or 24 or 25 or 36 or 37, L={10}; and for the downlink slot n=12 or 13 or 32 or 33, L={6}.

Optionally when the length of the slot is three OFDM symbols, in some other embodiments, for the downlink slot n=0 or 20, L={6, 7}; for the downlink slot n=1 or 21, L={7, 8}; for the downlink slot n=2 or 22, L={8, 9}; for the downlink slot n=3 or 23, L={11, 12}; and for the downlink slot n=4 or 24, L={14, 15}.

Optionally when the length of the slot is three OFDM symbols, in some other embodiments, for the downlink slot n=0 or 20, L={8, 9}; for the downlink slot n=1 or 21, L={9, 10}; for the downlink slot n=2 or 22, L={10, 11}; for the downlink slot n=3 or 23, L={11, 12, 13}; and for the downlink slot n=4 or 24, L={13, 14, 15}.

Optionally when the length of the slot is three OFDM symbols, in some other embodiments, for the downlink slot n=0 or 20, L={4, 5, 6, 7}; for the downlink slot n=1 or 21, L={7, 8, 9, 10}; for the downlink slot n=2 or 22, L={10, 11, 12, 13}; for the downlink slot n=3 or 23, L={13, 14, 15, 16}; and for the downlink slot n=4 or 24, L={16, 17, 18, 19}.

Optionally after the UE transmits the uplink data in the uplink data transmission slot, the method can further includes the UE receives feedback for the uplink data transmitted by the network side according to predefined uplink data feedback timing. The predefined feedback timing is that when the network side receives uplink data transmitted by the UE in a slot m−k, the network side transmits feedback for the uplink data to the UE in a slot m, where k∈K, both m and k are integers more than or equal to zero, and K represents a set of values of k.

Optionally when the length of the slot is seven OFDM symbols, in some embodiments, for the downlink slot m=0, 1, 10 or 11, K={7}; for the downlink slot m=2 or 1, K={5, 7}; and for the downlink slot m=8 or 18, K={9}.

Optionally when the length of the slot is seven OFDM symbols, for the downlink slot m=0 or 1 or 10 or 11, K={6}; for the downlink slot m=2 or 8 or 12 or 18, K={5}; and for the downlink slot m=6 or 16, K={7}.

Optionally when the length of the slot is seven OFDM symbols, for the downlink slot m=0 or 10, K={11}; for the downlink slot m=1 or 11, K={8, 7}; and for the downlink slot m=2 or 12, K={7, 5}.

Optionally when the length of the slot is seven OFDM symbols, in some other embodiments, for the downlink slot m=0 or 10, K={11, 6}; for the downlink slot m=1 or 11, K={6, 5}; and for the downlink slot m=2 or 12, K={5, 4}.

Optionally when the length of the slot is seven OFDM symbols, in some other embodiments, for the downlink slot m=0 or 10, K={11, 10, 9}; for the downlink slot m=1 or 11, K={9, 8, 7}; and for the downlink slot m=2 or 12, K={7, 6, 5, 4}.

Optionally when the length of the slot is three OFDM symbols, in some embodiments, for the downlink slot m=0 or 1 or 20 or 21, K={10}; for the downlink slot m=2 or 3 or 16 or 17 or 22 or 23 or 36 or 37, K={8}; and for the downlink slot m=4 or 5 or 12 or 13 or 24 or 25 or 32 or 33, K={6}.

Optionally when the length of the slot is three OFDM symbols, in some other embodiments, for the downlink slot m=0 or 20, K={14, 13}; for the downlink slot m=1 or 21, K={13, 12}; for the downlink slot m=2 or 22, K={12, 11}; for the downlink slot m=3 or 23, K={9, 8}; and for the downlink slot m=4 or 24, K={6, 5}.

Optionally when the length of the slot is three OFDM symbols, in some other embodiments, for the downlink slot m=0 or 20, K={12, 11}; for the downlink slot m=1 or 21, K={11, 10}; for the downlink slot m=2 or 22, K={10, 9}; for the downlink slot m=3 or 23, K={9, 8, 7}; and for the downlink slot m=4 or 24, K={7, 6, 5}.

Optionally when the length of the slot is three OFDM symbols, in some other embodiments, for the downlink slot m=0 or 20, K={19, 18, 17, 16}; for the downlink slot m=1 or 21, K={16, 15, 14, 13}; for the downlink slot m=2 or 22, K={13, 12, 11, 10}; for the downlink slot m=3 or 23, K={10, 9, 8, 7}; and for the downlink slot m=4 or 24, K={7, 6, 5, 4}.

Figure 13:
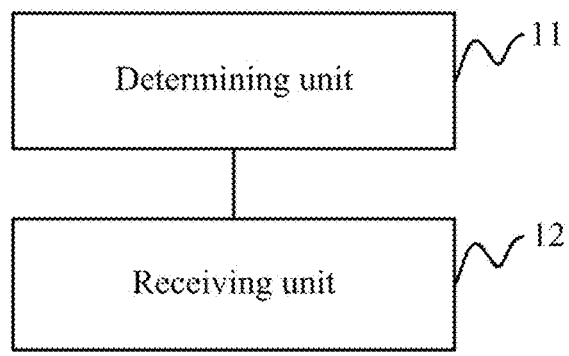
FIG. 13 is a schematic structural diagram of an apparatus for transmitting uplink data at a network side according to an embodiment of the disclosure.

Referring to FIG. 13, an apparatus for transmitting uplink data according to an embodiment of the disclosure at a network side, e.g., a base station side, includes a determining unit 11 configured to determine a size of a slot for transmitting data, and to transmit uplink scheduling signaling to a UE according to the size of the slot and a receiving unit 12 configured to receive uplink data transmitted by the UE according to predefined scheduling timing.

The slot is a temporal unit with a length shorter than 1 millisecond, and the predefined scheduling timing is: when the determining unit transmits uplink scheduling signaling in a slot n, the receiving unit receives uplink data transmitted by the UE in a slot n+1, where 1∈L, n is an integer more than or equal to zero, 1 is an integer greater than or equal to 1, and L represents a set of values of 1.

Optionally when the length of the slot is seven OFDM symbols, in some embodiments, for the downlink slot n=0 or 1 or 10 or 11, L={4}; for the downlink slot n=2 or 12, L={5, 7}; and for the downlink slot n=8 or 18, L={5}.

Optionally when the length of the slot is seven OFDM symbols, in some other embodiments, for the downlink slot n=0 or 10, L={5}; for the downlink slot n=1 or 8 or 11 or 18, L={6}; and for the downlink slot n=2 or 6 or 12 or 16, L={7}.

Optionally when the length of the slot is seven OFDM symbols, in some other embodiments, for the downlink slot n=0 or 10, L={4}; for the downlink slot n=1 or 11, L={4, 6}; and for the downlink slot n=2 or 12, L={7, 11}.

Optionally when the length of the slot is seven OFDM symbols, in some other embodiments, for the downlink slot n=0 or 10, L={4, 5}; for the downlink slot n=1 or 11, L={5, 6}; and for the downlink slot n=2 or 12, L={6, 7}.

Optionally when the length of the slot is seven OFDM symbols, in some other embodiments, for the downlink slot n=0 or 10, L={4, 5, 6}; for the downlink slot n=1 or 11, L={6, 7, 8}; and for the downlink slot n=2 or 12, L={8, 9, 10, 11}.

Optionally when the length of the slot is three OFDM symbols, in some embodiments, for the downlink slot n=0 or 1 or 2 or 3 or 20 or 21 or 22 or 23, L={8}; for the downlink slot n=4 or 5 or 16 or 17 or 24 or 25 or 36 or 37, L={10}; and for the downlink slot n=12 or 13 or 32 or 33, L={6}.

Optionally when the length of the slot is three OFDM symbols, in some other embodiments, for the downlink slot n=0 or 20, L={6, 7}; for the downlink slot n=1 or 21, L={7, 8}; for the downlink slot n=2 or 22, L={8, 9}; for the downlink slot n=3 or 23, L={11, 12}; and for the downlink slot n=4 or 24, L={14, 15}.

Optionally when the length of the slot is three OFDM symbols, in some other embodiments, for the downlink slot n=0 or 20, L={8, 9}; for the downlink slot n=1 or 21, L={9, 10}; for the downlink slot n=2 or 22, L={10, 11}; for the downlink slot n=3 or 23, L={11, 12, 13}; and for the downlink slot n=4 or 24, L={13, 14, 15}.

Optionally when the length of the slot is three OFDM symbols, in some other embodiments, for the downlink slot n=0 or 20, L={4, 5, 6, 7}; for the downlink slot n=1 or 21, L={7, 8, 9, 10}; for the downlink slot n=2 or 22. L={10, 11, 12, 13}; for the downlink slot n=3 or 23, L={13, 14, 15, 16}; and for the downlink slot n=4 or 24, L={16, 17, 18, 19}.

Optionally the determining unit is further configured to transmit feedback for the uplink data to the UE according to predefined uplink data feedback timing after the receiving unit receives the uplink data transmitted by the UE according to the predefined scheduling timing.

The predefined feedback timing is that when the receiving unit receives uplink data transmitted by the UE in a slot m−k, the determining unit transmits feedback for the uplink data to the UE in a slot m, where k∈K, both m and k are integers more than or equal to zero, and K represents a set of values of k.

Optionally when the length of the slot is seven OFDM symbols, in some embodiments, for the downlink slot m=0 or 1 or 10 or 11, K={7}; for the downlink slot m=2 or 12, K={5, 7}; and for the downlink slot m=8 or 18, K={9}.

Optionally when the length of the slot is seven OFDM symbols, for the downlink slot m=0 or 1 or 10 or 11, K={6}; for the downlink slot m=2 or 8 or 12 or 18, K={5}; and for the downlink slot m=6 or 16, K={7}.

Optionally when the length of the slot is seven OFDM symbols, for the downlink slot m=0 or 10, K={11}; for the downlink slot m=1 or 11, K={8, 7}; and for the downlink slot m=2 or 12, K={7, 5}.

Optionally when the length of the slot is seven OFDM symbols, in some other embodiments, for the downlink slot m=0 or 10, K={11, 6}; for the downlink slot m=1 or 11, K={6, 5}; and for the downlink slot m=2 or 12, K={5, 4}.

Optionally when the length of the slot is seven OFDM symbols, in some other embodiments, for the downlink slot m=0 or 10, K={11, 10, 9}; for the downlink slot m=1 or 11, K={9, 8, 7}; and for the downlink slot m=2 or 12, K={7, 6, 5, 4}.

Optionally when the length of the slot is three OFDM symbols, in some embodiments, for the downlink slot m=0 or 1 or 20 or 21, K={10}; for the downlink slot m=2 or 3 or 16 or 17 or 22 or 23 or 36 or 37, K={8}; and for the downlink slot m=4 or 5 or 12 or 13 or 24 or 25 or 32 or 33, K={6}.

Optionally when the length of the slot is three OFDM symbols, in some other embodiments, for the downlink slot m=0 or 20, K={14, 13}; for the downlink slot m=1 or 21, K={13, 12}; for the downlink slot m=2 or 22, K={12, 11}; for the downlink slot m=3 or 23, K={9, 8}; and for the downlink slot m=4 or 24, K={6, 5}.

Optionally when the length of the slot is three OFDM symbols, in some other embodiments, for the downlink slot m=0 or 20, K={12, 11}; for the downlink slot m=1 or 21, K={11, 10}; for the downlink slot m=2 or 22, K={10, 9}; for the downlink slot m=3 or 23, K={9, 8, 7}; and for the downlink slot m=4 or 24, K={7, 6, 5}.

Optionally when the length of the slot is three OFDM symbols, in some other embodiments, for the downlink slot m=0 or 20, K={19, 18, 17, 16}; for the downlink slot m=1 or 21, K={16, 15, 14, 13}; for the downlink slot m=2 or 22, K={13, 12, 11, 10}; for the downlink slot m=3 or 23, K={10, 9, 8, 7}; and for the downlink slot m=4 or 24, K={7, 6, 5, 4}.

Figure 14:
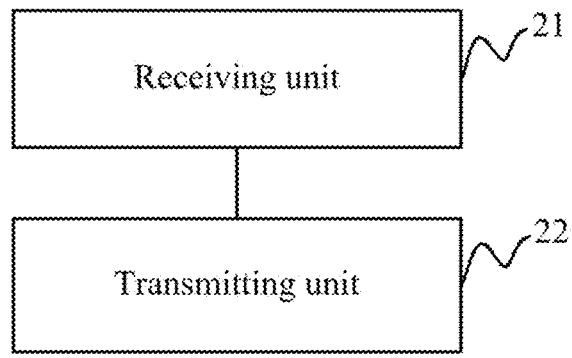
FIG. 14 is a schematic structural diagram of an apparatus for transmitting uplink data at a UE side according to an embodiment of the disclosure.

Accordingly referring to FIG. 14, an apparatus for transmitting uplink data according to an embodiment of the disclosure at a UE side includes: a receiving unit 21 configured to receive uplink scheduling signaling transmitted by the network side according to predefined scheduling tuning and to determine an uplink data transmission slot to transmit uplink data according to the uplink scheduling signaling and a transmitting unit 22 configured to transmit the uplink data in the uplink data transmission slot.

The slot is a temporal unit with a length shorter than 1 millisecond, and the predefined scheduling tinting is: when the network side transmits uplink scheduling signaling in a slot n, the transmitting unit transmits uplink data to the network side in a slot n+l, where l∈L, n is an integer more than or equal to zero, l is an integer greater than or equal to 1, and L represents a set of values of l.

Optionally when the length of the slot is seven OFDM symbols, in some embodiments, for the downlink slot n=0 or 1 or 10 or 11, L={4}; for the downlink slot n=2 or 12, L={5, 7}; and for the downlink slot n=8 or 18, L={5}.

Optionally when the length of the slot is seven OFDM symbols, in some other embodiments, for the downlink slot n=0 or 10, L={5}; for the downlink slot n=1 or 8 or 11 or 18, L={6}; and for the downlink slot n=2 or 6 or 12 or 16, L={7}.

Optionally when the length of the slot is seven OFDM symbols, in some other embodiments, for the downlink slot n=0 or 10, L={4}; for the downlink slot n=1 or 11, L={4, 6}; and for the downlink slot n=2 or 12, L={7, 11}.

Optionally when the length of the slot is seven OFDM symbols, in some other embodiments, for the downlink slot n=0 or 10, L={4, 5}; for the downlink slot n=1 or 11, L={5, 6}; and for the downlink slot n=2 or 12, L={6, 7}.

Optionally when the length of the slot is seven OFDM symbols, in some other embodiments, for the downlink slot n=0 or 10, L={4, 5, 6}; for the downlink slot n=1 or 11, L={6, 7, 8}; and for the downlink slot n=2 or 12, L={8, 9, 10, 11}.

Optionally when the length of the slot is three OFDM symbols, in some embodiments, for the downlink slot n=0 or 1 or 2 or 3 or 20 or 21 or 22 or 23, L={8}; for the downlink slot n=4 or 5 or 16 or 17 or 24 or 25 or 36 or 37, L={10}; and for the downlink slot n=12 or 13 or 32 or 33, L={6}.

Optionally when the length of the slot is three OFDM symbols, in some other embodiments, for the downlink slot n=0 or 20, L={6, 7}; for the downlink slot n=1 or 21, L={7, 8}; for the downlink slot n=2 or 22, L={8, 9}; for the downlink slot n=3 or 23, L={11, 12}; and for the downlink slot n=4 or 24, L={14, 15}.

Optionally when the length of the slot is three OFDM symbols, in some other embodiments, for the downlink slot n=0 or 20, L={8, 9}; for the downlink slot n=1 or 21, L={9, 10}; for the downlink slot n=2 or 22, L={10, 11}; for the downlink slot n=3 or 23, L={11, 12, 13}; and for the downlink slot n=4 or 24, L={13, 14, 15}.

Optionally when the length of the slot is three OFDM symbols, in some other embodiments, for the downlink slot n=0 or 20, L={4, 5, 6, 7}; for the downlink slot n=1 or 21, L={7, 8, 9, 10}; for the downlink slot n=2 or 22, L={10, 11, 12, 13}; for the downlink slot n=3 or 23, L={13, 14, 15, 16}; and for the downlink slot n=4 or 24, L={16, 17, 18, 19}.

Optionally after the transmitting unit transmits the uplink data in the uplink data transmission slot, the receiving unit is further configured to receive feedback for the uplink data transmitted by the network side according to predefined uplink data feedback timing. The predefined feedback timing is that when the network side receives uplink data transmitted by the transmitting unit in a slot m−k, the network side transmits feedback for the uplink data to the apparatus for transmitting uplink data in the slot m, where k∈K, both m and k are integers more than or equal to zero, and K represents a set of values of k.

Optionally when the length of the slot is seven OFDM symbols, in some embodiments, for the downlink slot m=0 or 1 or 10 or 11, K={7}; for the downlink slot m=2 or 12, K={5, 7}; and for the downlink slot m=8 or 18, K={9}.

Optionally when the length of the slot is seven OFDM symbols, for the downlink slot m=0 or 1 or 10 or 11, K={6}; for the downlink slot m=2 or 8 or 12 or 18, K={5}; and for the downlink slot m=6 or 16, K={7}.

Optionally when the length of the slot is seven OFDM symbols, for the downlink slot m=0 or 10, K={11}; for the downlink slot m=1 or 11, K={8, 7}; and for the downlink slot m=2 or 12, K={7, 5}.

Optionally when the length of the slot is seven OFDM symbols, in some other embodiments, for the downlink slot m=0 or 10, K={11, 6}; for the downlink slot m=1 or 11, K={6, 5}; and for the downlink slot m=2 or 12, K={5, 4}.

Optionally when the length of the slot is seven OFDM symbols, in some other embodiments, for the downlink slot m=0 or 10, K={11, 10, 9}; for the downlink slot m=1 or 11, K={9, 8, 7}; and for the downlink slot m=2 or 12, K={7, 6, 5, 4}.

Optionally when the length of the slot is three OFDM symbols, in some embodiments, for the downlink slot m=0 or 1 or 20 or 21, K={10}; for the downlink slot m=2 or 3 or 16 or 17 or 22 or 23 or 36 or 37, K={8}; and for the downlink slot m=4 or 5 or 12 or 13 or 24 or 25 or 32 or 33, K={6}.

Optionally when the length of the slot is three OFDM symbols, in some other embodiments, for the downlink slot m=0 or 20, K={14, 13}; for the downlink slot m=1 or 21, K={13, 12}; for the downlink slot m=2 or 22, K={12, 11}; for the downlink slot m=3 or 23, K={9, 8}; and for the downlink slot m=4 or 24, K={6, 5}.

Optionally when the length of the slot is three OFDM symbols, in some other embodiments, for the downlink slot m=0 or 20, K={12, 11}; for the downlink slot m=1 or 21, K={11, 10}; for the downlink slot m=2 or 22, K={10, 9}; for the downlink slot m=3 or 23, K={9, 8, 7}; and for the downlink slot m=4 or 24, K={7, 6, 5}.

Optionally when the length of the slot is three OFDM symbols, in some other embodiments, for the downlink slot m=0 or 20, K={19, 18, 17, 16}; for the downlink slot m=1 or 21, K={16, 15, 14, 13}; for the downlink slot m=2 or 22, K={13, 12, 11, 10}; for the downlink slot m=3 or 23, K={10, 9, 8, 7}; and for the downlink slot m=4 or 24, K={7, 6, 5, 4}.

Figure 15:
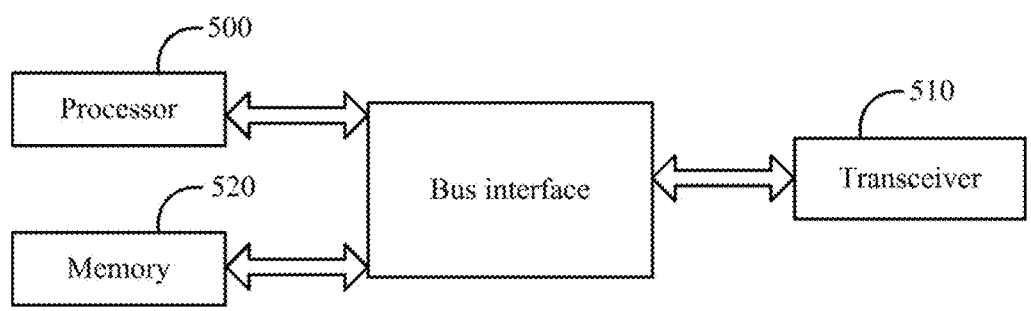
FIG. 15 is a schematic structural diagram of an apparatus for transmitting uplink data at a network side according to an embodiment of the disclosure.

Referring to FIG. 15, another apparatus for transmitting uplink data according to an embodiment of the disclosure at a network side, e.g., a base station side, includes a processor 500 configured to read and execute a program in a memory 520 to: determine a size of a slot for transmitting data and transmit uplink scheduling signaling to a UE according to the size of the slot; and receive uplink data transmitted by the UE through a transceiver 510 according to predefined scheduling timing.

The slot is a temporal unit with a length shorter than 1 millisecond, and the predefined scheduling timing is: when the apparatus for transmitting uplink data transmits uplink scheduling signaling in a slot n, the apparatus for transmitting uplink data receives uplink data transmitted by the UE in a slot n+l, where l∈L, n is an integer more than or equal to zero, l is an integer greater than or equal to 1, and L represents a set of values of l.

Optionally when the length of the slot is seven OFDM symbols, in some embodiments, for the downlink slot n=0 or 1 or 10 or 11, L={4}; for the downlink slot n=2 or 12, L={5, 7}; and for the downlink slot n=8 or 18, L={5}.

Optionally when the length of the slot is seven OFDM symbols, in some other embodiments, for the downlink slot n=0 or 10, L={5}; for the downlink slot n=1 or 8 or 11 or 18, L={6}; and for the downlink slot n=2 or 6 or 12 or 16, L={7}.

Optionally when the length of the slot is seven OFDM symbols, in some other embodiments, for the downlink slot n=0 or 10, L={4}; for the downlink slot n=1 or 11, L={4, 6}; and for the downlink slot n=2 or 12, L={7, 11}.

Optionally when the length of the slot is seven OFDM symbols, in some other embodiments, for the downlink slot n=0 or 10, L={4, 5}; for the downlink slot n=1 or 11, L={5, 6}; and for the downlink slot n=2 or 12, L={6, 7}.

Optionally when the length of the slot is seven OFDM symbols, in some other embodiments, for the downlink slot n=0 or 10, L={4, 5, 6}; for the downlink slot n=1 or 11, L={6, 7, 8}; and for the downlink slot n=2 or 12, L={8, 9, 10, 11}.

Optionally when the length of the slot is three OFDM symbols, in some embodiments, for the downlink slot n=0 or 1 or 2 or 3 or 20 or 21 or 22 or 23, L={8}; for the downlink slot n=4 or 5 or 16 or 17 or 24 or 25 or 36 or 37, L={10}; and for the downlink slot n=12 or 13 or 32 or 33, L={6}.

Optionally when the length of the slot is three OFDM symbols, in some other embodiments, for the downlink slot n=0 or 20, L={6, 7}; for the downlink slot n=1 or 21, L={7, 8}; for the downlink slot n=2 or 22, L={8, 9}; for the downlink slot n=3 or 23, L={11, 12}; and for the downlink slot n=4 or 24, L={14, 15}.

Optionally when the length of the slot is three OFDM symbols, in some other embodiments, for the downlink slot n=0 or 20. L={8, 9}; for the downlink slot n=1 or 21. L={9, 10}; for the downlink slot n=2 or 22, L={10, 11}; for the downlink slot n=3 or 23, L={11, 12, 13}; and for the downlink slot n=4 or 24, L={13, 14, 15}.

n some other embodiments, for the downlink slot n=0 or 20, L={4, 5, 6, 7}; for the downlink slot n=1 or 21, L={7, 8, 9, 10}; for the downlink slot n=2 or 22, L={10, 11, 12, 13}; for the downlink slot n=3 or 23, L={13, 14, 15, 16}; and for the downlink slot n=4 or 24, L={16, 17, 18, 19}.

Optionally the processor 500 is further configured to transmit feedback for the uplink data to the UE through the transceiver 510 according to predefined uplink data feedback timing after the uplink data transmitted by the UE is received through the transceiver 510 according to the predefined scheduling timing.

The predefined feedback timing is that when the apparatus for transmitting uplink data receives uplink data transmitted by the UE in a slot m−k, the determining unit transmits feedback for the uplink data to the UE in a slot m, where k∈K, both m and k are integers more than or equal to zero, and K represents a set of values of k.

Optionally when the length of the slot is seven OFDM symbols, in some embodiments, for the downlink slot m=0 or 1 or 10 or 11, K={7}; for the downlink slot m=2 or 12, K={5, 7}; and for the downlink slot m=8 or 18, K={9}.

Optionally when the length of the slot is seven OFDM symbols, for the downlink slot m=0 or 1 or 10 or 11, K={6}; for the downlink slot m=2 or 8 or 12 or 18, K={5}; and for the downlink slot m=6 or 16, K={7}.

Optionally when the length of the slot is seven OFDM symbols, for the downlink slot m=0 or 10, K={11}; for the downlink slot m=1 or 11, K={8, 7}; and for the downlink slot m=2 or 12, K={7, 5}.

Optionally when the length of the slot is seven OFDM symbols, in some other embodiments, for the downlink slot m=0 or 10, K={11, 6}; for the downlink slot m=1 or 11; K={6, 5}; and for the downlink slot m=2 or 12, K={5, 4}.

Optionally when the length of the slot is seven OFDM symbols, in some other embodiments, for the downlink slot m=0 or 10, K={11, 10, 9}; for the downlink slot m=1 or 11, K={9, 8, 7}; and for the downlink slot m=2 or 12, K={7, 6, 5, 4}.

Optionally when the length of the slot is three OFDM symbols, in some embodiments, for the downlink slot m=0 or 1 or 20 or 21, K={10}; for the downlink slot m=2 or 3 or 16 or 17 or 22 or 23 or 36 or 37, K={8}; and for the downlink slot m=4 or 5 or 12 or 13 or 24 or 25 or 32 or 33, K={6}.

Optionally when the length of the slot is three OFDM symbols, in some other embodiments, for the downlink slot m=0 or 20, K={14, 13}; for the downlink slot m=1 or 21, K={13, 12}; for the downlink slot m=2 or 22, K={12, 11}; for the downlink slot m=3 or 23, K={9, 8}; and for the downlink slot m=4 or 24, K={6, 5}.

Optionally when the length of the slot is three OFDM symbols, in some other embodiments, for the downlink slot m=0 or 20, K={12, 11}; for the downlink slot m=1 or 21, K={11, 10}; for the downlink slot m=2 or 22, K={10, 9}; for the downlink slot m=3 or 23, K={9, 8, 7}; and for the downlink slot m=4 or 24, K={7, 6, 5}.

Optionally when the length of the slot is three OFDM symbols, in some other embodiments, for the downlink slot m=0 or 20, K={19, 18, 17, 16}; for the downlink slot m=1 or 21, K={16, 15, 14, 13}; for the downlink slot m=2 or 22, K={13, 12, 11, 10}; for the downlink slot m=3 or 23, K={10, 9, 8, 7}; and for the downlink slot m=4 or 24, K={7, 6, 5, 4}.

The transceiver 510 is configured to be controlled by the processor 500 to receive and transmit data.

Here in FIG. 15, the bus architecture can include any number of interconnected buses and bridges to particularly link together various circuits including one or more processors represented by the processor 500, and one or more memories represented by the memory 520. The bus architecture can further link together various other circuits such as prophetical devices, manostats and power management circuits all of which are well known in the art, so a further description thereof is omitted in this context. A bus interface provides an interface. The transceiver 510 can include a plurality of elements including a transmitter and a receiver, which are units for communication with various other devices over a transmission medium. The processor 500 is responsible for managing the bus architecture and performing normal processes, and the memory 520 can store data used by the processor 500 when performing operations.

Figure 16:
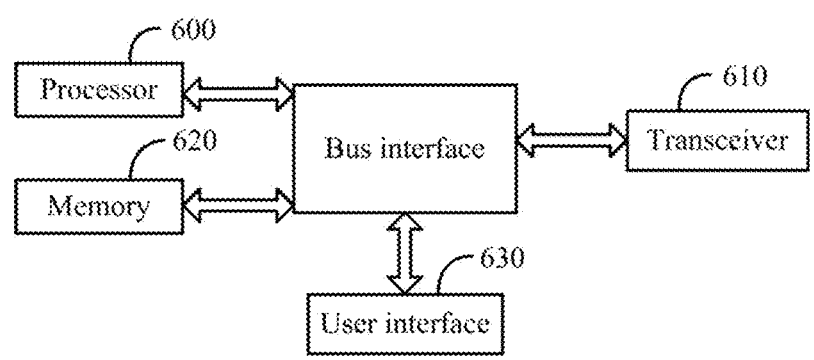
FIG. 16 is a schematic structural diagram of an apparatus for transmitting uplink data at a UE side according to an embodiment of the disclosure.

Accordingly referring to FIG. 16, another apparatus for transmitting uplink data according to an embodiment of the disclosure at a UE side includes: a processor 600 configured to read a program in a memory 620 to perform the following operations: receiving uplink scheduling signaling transmitted by a network side according to predefined scheduling timing through a transceiver 610, and determining an uplink data transmission slot to transmit uplink data according to the uplink scheduling signaling; and transmitting the uplink data in the uplink data transmission slot through the transceiver 610.

The slot is a temporal unit with a length shorter than 1 millisecond, and the predefined scheduling timing is: when the network side transmits uplink scheduling signaling in a slot n, the apparatus for transmitting uplink data transmits uplink data to the network side in a slot n+l, where l∈L, n is an integer more than or equal to zero, l is an integer greater than or equal to 1, and L represents a set of values of l.

Optionally when the length of the slot is seven OFDM symbols, in some embodiments, for the downlink slot n=0 or 1 or 10 or 11, L={4}; for the downlink slot n=2 or 12, L={5, 7}; and for the downlink slot n=8 or 18, L={5}.

Optionally when the length of the slot is seven OFDM symbols, in some other embodiments, for the downlink slot n=0 or 10, L={5}; for the downlink slot n=1 or 8 or 11 or 18, L={6}; and for the downlink slot n=2 or 6 or 12 or 16, L={7}.

Optionally when the length of the slot is seven OFDM symbols, in some other embodiments, for the downlink slot n=0 or 10, L={4}; for the downlink slot n=1 or 11, L={4, 6}; and for the downlink slot n=2 or 12, L={7, 11}.

Optionally when the length of the slot is seven OFDM symbols, in some other embodiments, for the downlink slot n=0 or 10, L={4, 5}; for the downlink slot n=1 or 11, L={5, 6}; and for the downlink slot n=2 or 12, L={6, 7}.

Optionally when the length of the slot is seven OFDM symbols, in some other embodiments, for the downlink slot n=0 or 10, L={4, 5, 6}; for the downlink slot n=1 or 11, L={6, 7, 8}; and for the downlink slot n=2 or 12, L={8, 9, 10, 11}.

Optionally when the length of the slot is three OFDM symbols, in some embodiments, for the downlink slot n=0 or 1 or 2 or 3 or 20 or 21 or 22 or 23, L={8}; for the downlink slot n=4 or 5 or 16 or 17 or 24 or 25 or 36 or 37, L={10}; and for the downlink slot n=12 or 13 or 32 or 33, L={6}.

Optionally when the length of the slot is three OFDM symbols, in some other embodiments, for the downlink slot n=0 or 20. L={6, 7}; for the downlink slot n=1 or 21. L={7, 8}; for the downlink slot n=2 or 22, L={8, 9}; for the downlink slot n=3 or 23, L={11, 12}; and for the downlink slot n=4 or 24, L={14, 15}.

Optionally when the length of the slot is three OFDM symbols, in some other embodiments, for the downlink slot n=0 or 20, L={8, 9}; for the downlink slot n=1 or 21, L={9, 10}; for the downlink slot n=2 or 22, L={10, 11}; for the downlink slot n=3 or 23, L={11, 12, 13}; and for the downlink slot n=4 or 24, L={13, 14, 15}.

Optionally when the length of the slot is three OFDM symbols, in some other embodiments, for the downlink slot n=0 or 20, L={4, 5, 6, 7}; for the downlink slot n=1 or 21, L={7, 8, 9, 10}; for the downlink slot n=2 or 22, L={10, 11, 12, 13}; for the downlink slot n=3 or 23, L={13, 14, 15, 16}; and for the downlink slot n=4 or 24, L={16, 17, 18, 19}.

Optionally after the processor 600 transmits the uplink data in the uplink data transmission slot through the transceiver 610, the processor 600 is further configured to: receive feedback for the uplink data transmitted by the network side through the transceiver 610 according to predefined uplink data feedback timing, where the predefined feedback timing is that when the network side receives uplink data transmitted by the transmitting unit in a slot m−k, the network side transmits feedback for the uplink data to the apparatus for transmitting uplink data in a slot m, where k∈K, both m and k are integers more than or equal to zero, and K represents a set of values of k.

Optionally when the length of the slot is seven OFDM symbols, in some embodiments, for the downlink slot m=0 or 1 or 10 or 11, K={7}; for the downlink slot m=2 or 12, K={5, 7}; and for the downlink slot m=8 or 18, K={9}.

Optionally when the length of the slot is seven OFDM symbols, for the downlink slot m=0 or 1 or 10 or 11, K={6}; for the downlink slot m=2 or 8 or 12 or 18, K={5}; and for the downlink slot m=6 or 16, K={7}.

Optionally when the length of the slot is seven OFDM symbols, for the downlink slot m=0 or 10, K={11}; for the downlink slot m=1 or 11, K={8, 7}; and for the downlink slot m=2 or 12, K={7, 5}.

Optionally when the length of the slot is seven OFDM symbols, in some other embodiments, for the downlink slot m=0 or 10, K={11, 6}; for the downlink slot m=1 or 11, K={6, 5}; and for the downlink slot m=2 or 12, K={5, 4}.

Optionally when the length of the slot is seven OFDM symbols, in some other embodiments, for the downlink slot m=0 or 10, K={11, 10, 9}; for the downlink slot m=1 or 11, K={9, 8, 7}; and for the downlink slot m=2 or 12, K={7, 6, 5, 4}.

Optionally when the length of the slot is three OFDM symbols, in some embodiments, for the downlink slot m=0 or 1 or 20 or 21, K={10}; for the downlink slot m=2 or 3 or 16 or 17 or 22 or 23 or 36 or 37, K={8}; and for the downlink slot m=4 or 5 or 12 or 13 or 24 or 25 or 32 or 33, K={6}.

Optionally when the length of the slot is three OFDM symbols, in some other embodiments, for the downlink slot m=0 or 20, K={14, 13}; for the downlink slot m=1 or 21, K={13, 12}; for the downlink slot m=2 or 22, K={12, 11}; for the downlink slot m=3 or 23, K={9, 8}; and for the downlink slot m=4 or 24, K={6, 5}.

Optionally when the length of the slot is three OFDM symbols, in some other embodiments, for the downlink slot m=0 or 20, K={12, 11}; for the downlink slot m=1 or 21, K={11, 10}; for the downlink slot m=2 or 22, K={10, 9}; for the downlink slot m=3 or 23, K={9, 8, 7}; and for the downlink slot m=4 or 24, K={7, 6, 5}.

Optionally when the length of the slot is three OFDM symbols, in some other embodiments, for the downlink slot m=0 or 20, K={19, 18, 17, 16}; for the downlink slot m=1 or 21, K={16, 15, 14, 13}; for the downlink slot m=2 or 22, K={13, 12, 11, 10}; for the downlink slot m=3 or 23, K={10, 9, 8, 7}; and for the downlink slot m=4 or 24, K={7, 6, 5, 4}.

The transceiver 610 is configured to be controlled by the processor 600 to receive and transmit data.

Here in FIG. 16, the bus architecture can include any number of interconnected buses and bridges to link together various circuits including one or more processors represented by the processor 600 and one or more memories represented by the memory 620. The bus architecture can further link together various other circuits such as prophetical devices, manostats and power management circuits, all of which are well known in the art, so a further description thereof is omitted in this context. The bus interface provides an interface. The transceiver 610 can be a plurality of elements including a transmitter and a receiver, which are units for communication with various other devices over a transmission medium. For different user equipments, a user interface 630 can also be an interface via which desirable devices can be connected internally or externally, and the connected devices can include but is not limited to a keypad, a display, a speaker, a microphone or a joystick.

The processor 600 is responsible for managing the bus architecture and performing normal processes, and the memory 620 can store data used by the processor 600 when performing the operations.

In summary, with the method and apparatus for transmitting uplink data according to the embodiments of the disclosure, the UE transmitting in a short slot can prepare the uplink data to be transmitted more quickly upon reception of the scheduling signaling, and the base station can also decode a received data packet and make feedback or schedule re-transmission more quickly. The solutions according to the embodiments of the disclosure can shorten RTT in the uplink, shorten a user-plane delay, and improve the overall performance of the system.

Those skilled in the art shall appreciate that the embodiments of the disclosure can be embodied as a method, a system or a computer program product. Therefore the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a disk memory and an optical memory) in which computer useable program codes are contained.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied by computer program instructions. These computer program instructions can be provided to a processor of a general-purpose computer, of a specific-purpose computer, of an embedded processing machine or of another programmable data processing device to produce a machine so that the instructions executed by the processor of computer or another programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which performs the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A method for transmitting uplink data, comprising:
   determining, by a network side, a size of a slot for transmitting data, and transmitting uplink scheduling signaling to a User Equipment (UE) according to the size of the slot; and
   receiving, by the network side, uplink data transmitted by the UE according to predefined scheduling timing;
   wherein the slot is a temporal unit with a length shorter than 1 millisecond, and the predefined scheduling timing is: when the network side transmits the uplink scheduling signaling in a slot n, the network side receives the uplink data transmitted by the UE in a slot n+l, wherein l∈L, n is an integer more than or equal to zero, l is an integer greater than or equal to 1, and L represents a set of values of l;

wherein the length of the slot is seven Orthogonal Frequency Division Multiplexing (OFDM) symbols, and a radio frame comprises 20 slots; and for the downlink slot n=0 or 1 or 10 or 11, L={4}; for the downlink slot n=2 or 12, L={5, 7}; and for the downlink slot n=8 or 18, L={5}; or for the downlink slot n=0 or 10, L={5}; for the downlink slot n=1 or 8 or 11 or 18, L={6}; and for the downlink slot n=2 or 6 or 12 or 16, L={7}; or for the downlink slot n=0 or 10, L={4}; for the downlink slot n=1 or 11, L={4, 6}; and for the downlink slot n=2 or 12, L={7, 11}; or for the downlink slot n=0 or 10, L={4, 5}; for the downlink slot n=1 or 11, L={5, 6}; and for the downlink slot n=2 or 12, L={6, 7}; or for the downlink slot n=0 or 10, L={4, 5, 6}; for the downlink slot n=1 or 11, L={6, 7, 8}; and for the downlink slot n=2 or 12, L={8, 9, 10, 11}.

2. The method according to claim 1, wherein after the network side receives the uplink data transmitted by the UE according to the predefined scheduling timing, the method further comprises:

transmitting, by the network side, feedback for the uplink data to the UE according to predefined uplink data feedback timing;

wherein the predefined feedback timing is that when the network side receives the uplink data transmitted by the UE in a slot m−k, the network side transmits feedback for the uplink data to the UE in a slot m, wherein k∈K, both m and k are integers more than or equal to zero, and K represents a set of values of k.

3. The method according to claim 2, wherein the length of the slot is seven OFDM symbols; and for the downlink slot m=0 or 1 or 10 or 11, K={7}; for the downlink slot m=2 or 12, K={5, 7}; and for the downlink slot m=8 or 18, K={9}; or for the downlink slot m=0 or 1 or 10 or 11, K={6}; for the downlink slot m=2 or 8 or 12 or 18, K={5}; and for the downlink slot m=6 or 16, K={7}; or for the downlink slot m=0 or 10, K={11}; for the downlink slot m=1 or 11, K={8, 7}; and for the downlink slot m=2 or 12, K={7, 5}; or for the downlink slot m=0 or 10, K={11, 6}; for the downlink slot m=1 or 11, K={6, 5}; and for the downlink slot m=2 or 12, K={5, 4}; or for the downlink slot m=0 or 10, K={11, 10, 9}; for the downlink slot m=1 or 11, K={9, 8, 7}; and for the downlink slot m=2 or 12, K={7, 6, 5, 4}.

4. A method for transmitting uplink data, comprising:

receiving, by a User Equipment (UE), uplink scheduling signaling transmitted by a network side according to predefined scheduling timing, and determining an uplink data transmission slot to transmit uplink data according to the uplink scheduling signaling; and transmitting, by the UE, the uplink data in the uplink data transmission slot;

wherein the slot is a temporal unit with a length shorter than 1 millisecond, and the predefined scheduling timing is: when the network side transmits the uplink scheduling signaling in a slot n, the UE transmits the uplink data to the network side in a slot n+l, wherein l∈L, n is an integer more than or equal to zero, l is an integer more than or equal to 1 and L represents a set of values of l;

wherein the length of the slot is seven Orthogonal Frequency Division Multiplexing (OFDM) symbols; and for the downlink slot n=0 or 1 or 10 or 11, L={4}; for the downlink slot n=2 or 12, L={5, 7}; and for the downlink slot n=8 or 18, L={5}; or for the downlink slot n=0 or 10, L={5}; for the downlink slot n=1 or 8 or 11 or 18, L={6}; and for the downlink slot n=2 or 6 or 12 or 16, L={7}; or for the downlink slot n=0 or 10, L={4}; for the downlink slot n=1 or 11, L={4, 6}; and for the downlink slot n=2 or 12, L={7, 11}; or for the downlink slot n=0 or 10, L={4, 5}; for the downlink slot n=1 or 11, L={5, 6}; and for the downlink slot n=2 or 12, L={6, 7}; or for the downlink slot n=0 or 10, L={4, 5, 6}; for the downlink slot n=1 or 11, L={6, 7, 8}; and for the downlink slot n=2 or 12, L={8, 9, 10, 11}.

5. The method according to claim 4, wherein after the UE transmits the uplink data in the uplink data transmission slot, the method further comprises:

receiving, by the UE, feedback for the uplink data transmitted by the network side according to predefined uplink data feedback timing;

wherein the predefined feedback timing is that when the network side receives the uplink data transmitted by the UE in a slot m−k, the network side transmits the feedback for the uplink data to the UE in a slot m, wherein k∈K, both m and k are integers more than or equal to zero, and K represents a set of values of k.

6. The method according to claim 5, wherein the length of the slot is seven OFDM symbols; and for the downlink slot m=0 or 1 or 10 or 11, K={7}; for the downlink slot m=2 or 12, K={5, 7}; and for the downlink slot m=8 or 18, K={9}; or for the downlink slot m=0 or 1 or 10 or 11, K={6}; for the downlink slot m=2 or 8 or 12 or 18, K={5}; and for the downlink slot m=6 or 16, K={7}; or for the downlink slot m=0 or 10, K={11}; for the downlink slot m=1 or 11, K={8, 7}; and for the downlink slot m=2 or 12, K={7, 5}; or for the downlink slot m=0 or 10, K={11, 6}; for the downlink slot m=1 or 11, K={6, 5}; and for the downlink slot m=2 or 12, K={5, 4}; or for the downlink slot m=0 or 10, K={11, 10, 9}; for the downlink slot m=1 or 11, K={9, 8, 7}; and for the downlink slot m=2 or 12, K={7, 6, 5, 4}.

7. An apparatus for transmitting uplink data, comprising:
a transceiver;
a processor; and
a memory storing at least one instruction, wherein the processor is configured to execute the at least one instruction to:
determine a size of a slot for transmitting data, and control the transceiver to transmit uplink scheduling signaling to a User Equipment (UE) according to the size of the slot; and
control the transceiver to receive uplink data transmitted by the UE according to predefined scheduling timing;
wherein the slot is a temporal unit with a length shorter than 1 millisecond, and the predefined scheduling timing is: when the transceiver transmits the uplink scheduling signaling in a slot n, the transceiver receives the uplink data transmitted by the UE in a slot n+l, wherein l∈L, n is an integer more than or equal to zero, l is an integer greater than or equal to 1, and L represents a set of values of l;

wherein the length of the slot is seven Orthogonal Frequency Division Multiplexing (OFDM) symbols; and for the downlink slot n=0 or 1 or 10 or 11, L={4}; for the downlink slot n=2 or 12, L={5, 7}; and for the downlink slot n=8 or 18, L={5}; or for the downlink slot n=0 or 10, L={5}; for the downlink slot n=1 or 8 or 11 or 18, L={6}; and for the downlink slot n=2 or 6 or 12 or 16, L={7}; or for the downlink slot n=0 or 10, L={4}; for the downlink slot n=1 or 11, L={4, 6}; and for the downlink slot n=2 or 12, L={7, 11}; or for the downlink slot n=0 or 10, L={4, 5}; for the downlink slot n=1 or 11, L={5, 6}; and for the downlink slot n=2 or 12, L={6, 7}; or for the downlink slot n=0 or 10, L={4, 5, 6}; for the downlink slot n=1 or 11, L={6, 7, 8}; and for the downlink slot n=2 or 12, L={8, 9, 10, 11}.

8. The apparatus according to claim 7, wherein the processor is further configured to execute the at least one instruction to control the transceiver to transmit feedback for the uplink data to the UE according to predefined uplink data feedback timing after the transceiver receives the uplink data transmitted by the UE according to the predefined scheduling timing;

wherein the predefined feedback timing is that when the transceiver receives uplink data transmitted by the UE in a slot m−k, the transceiver transmits feedback for the uplink data to the UE in a slot m, wherein k∈K, both m and k are integers more than or equal to zero, and K represents a set of values of k.

9. The apparatus according to claim 8, wherein the length of the slot is seven OFDM symbols; and for the downlink slot m=0 or 1 or 10 or 11, K={7}; for the downlink slot m=2 or 12, K={5, 7}; and for the downlink slot m=8 or 18, K={9}; or for the downlink slot m=0 or 1 or 10 or 11, K={6}; for the downlink slot m=2 or 8 or 12 or 18, K={5}; and for the downlink slot m=6 or 16, K={7}; or for the downlink slot m=0 or 10, K={11}; for the downlink slot m=1 or 11, K={8, 7}; and for the downlink slot m=2 or 12, K={7, 5}; or for the downlink slot m=0 or 10, K={11, 6}; for the downlink slot m=1 or 11, K={6, 5}; and for the downlink slot m=2 or 12, K={5, 4}; or for the downlink slot m=0 or 10, K={11, 10, 9}; for the downlink slot m=1 or 11, K={9, 8, 7}; and for the downlink slot m=2 or 12, K={7, 6, 5, 4}.

10. An apparatus for transmitting uplink data, comprising:
a transceiver;
a processor; and
a memory storing at least one instruction, wherein the processor is configured to execute the at least one instruction to:
control the transceiver to receive uplink scheduling signaling transmitted by a network side according to predefined scheduling timing, and determine an uplink data transmission slot to transmit uplink data according to the uplink scheduling signaling; and
control the transceiver to transmit the uplink data in the uplink data transmission slot;

wherein the slot is a temporal unit with a length shorter than 1 millisecond, and the predefined scheduling timing is: when the network side transmits the uplink scheduling signaling in a slot n, the transceiver transmits the uplink data to the network side in a slot n+l, wherein l∈L, n is an integer more than or equal to zero, l is an integer more than or equal to 1 and L represents a set of values of l;

wherein the length of the slot is seven Orthogonal Frequency Division Multiplexing (OFDM) symbols; and for the downlink slot n=0 or 1 or 10 or 11, L={4}; for the downlink slot n=2 or 12, L={5, 7}; and for the downlink slot n=8 or 18, L={5}; or for the downlink slot n=0 or 10, L={5}; for the downlink slot n=1 or 8 or 11 or 18, L={6}; and for the downlink slot n=2 or 6 or 12 or 16, L={7}; or for the downlink slot n=0 or 10, L={4}; for the downlink slot n=1 or 11, L={4, 6}; and for the downlink slot n=2 or 12, L={7, 11}; or for the downlink slot n=0 or 10, L={4, 5}; for the downlink slot n=1 or 11, L={5, 6}; and for the downlink slot n=2 or 12, L={6, 7}; or for the downlink slot n=0 or 10, L={4, 5, 6}; for the downlink slot n=1 or 11, L={6, 7, 8}; and for the downlink slot n=2 or 12, L={8, 9, 10, 11}.

11. The apparatus according to claim 10, wherein after the transceiver transmits the uplink data in the uplink data transmission slot, the processor is further configured to execute the at least one instruction to:

control the transceiver to receive feedback for the uplink data transmitted by the network side according to predefined uplink data feedback timing;

wherein the predefined feedback timing is that when the network side receives the uplink data transmitted by the transceiver in a slot m−k, the network side transmits feedback for the uplink data to the apparatus for transmitting uplink data, in a slot m, wherein k∈K, both m and k are integers more than or equal to zero, and K represents a set of values of k.

12. The apparatus according to claim 11, wherein the length of the slot is seven OFDM symbols; and for the downlink slot m=0 or 1 or 10 or 11, K={7}; for the downlink slot m=2 or 12, K={5, 7}; and for the downlink slot m=8 or 18, K={9}; or for the downlink slot m=0 or 1 or 10 or 11, K={6}; for the downlink slot m=2 or 8 or 12 or 18, K={5}; and for the downlink slot m=6 or 16, K={7}; or for the downlink slot m=0 or 10, K={11}; for the downlink slot m=1 or 11, K={8, 7}; and for the downlink slot m=2 or 12, K={7, 5}; or for the downlink slot m=0 or 10, K={11, 6}; for the downlink slot m=1 or 11, K={6, 5}; and for the downlink slot m=2 or 12, K={5, 4}; or for the downlink slot m=0 or 10, K={11, 10, 9}; for the downlink slot m=1 or 11, K={9, 8, 7}; and for the downlink slot m=2 or 12, K={7, 6, 5, 4}.

\* \* \* \* \*